United States Patent
Bell et al.

(10) Patent No.: US 10,211,685 B2
(45) Date of Patent: Feb. 19, 2019

(54) SYSTEMS AND METHODS FOR REAL OR NEAR REAL TIME WIRELESS COMMUNICATIONS BETWEEN A WIRELESS POWER TRANSMITTER AND A WIRELESS POWER RECEIVER

(71) Applicant: ENERGOUS CORPORATION, San Jose, CA (US)

(72) Inventors: Douglas Bell, Pleasanton, CA (US); Michael A. Leabman, San Ramon, CA (US)

(73) Assignee: Energous Corporation, San Jose, CA (US)

( * ) Notice: Subject to any disclaimer, the term of this patent is extended or adjusted under 35 U.S.C. 154(b) by 0 days.

(21) Appl. No.: 15/061,140

(22) Filed: Mar. 4, 2016

(65) Prior Publication Data
US 2017/0110914 A1    Apr. 20, 2017

Related U.S. Application Data

(63) Continuation-in-part of application No. 14/856,219, filed on Sep. 16, 2015, now Pat. No. 10,158,259.
(Continued)

(51) Int. Cl.
*H02J 50/90*    (2016.01)
*H02J 7/02*    (2016.01)
(Continued)

(52) U.S. Cl.
CPC ............ *H02J 50/80* (2016.02); *H02J 7/025* (2013.01); *H02J 50/20* (2016.02); *H02J 50/90* (2016.02); *H04W 4/80* (2018.02)

(58) Field of Classification Search
CPC .. H02J 7/025; H02J 5/005; H02J 17/00; H02J 50/15; H02J 50/20; H02J 50/23;
(Continued)

(56) References Cited

U.S. PATENT DOCUMENTS 787,412 A    4/1905 Tesla
3,167,775 A    1/1965 Guertler
(Continued)

FOREIGN PATENT DOCUMENTS

CN    203826555 U    9/2014
CN    104090265 A    10/2014
(Continued)

OTHER PUBLICATIONS

International Search Report dated Sep. 12, 2014 corresponding to International Patent Application No. PCT/US2014/037072, 3 pages.
(Continued)

*Primary Examiner* — David V Henze-Gongola
(74) *Attorney, Agent, or Firm* — Morgan, Lewis & Bockius LLP

(57) ABSTRACT

Disclosed herein are systems, methods, and devices using an improved wireless communications component that allows for real time or near-real time data sampling reporting between devices using modified wireless communications protocols (e.g., Bluetooth®, Wi-Fi), and real time or near-real time behavior adjustments by a first device based on the data samples received from a second device. Embodiments disclosed herein comprise devices, such as receivers and transmitters, having communications components that may communicate data samples, such as power values, in real time or near-real time, thereby allowing a first device (e.g., transmitter) to adjust in real time or near-real time operational behavior of the first device's hardware or software (e.g., adjust power waves) based upon the data samples (e.g., power values) received from a second device (e.g., receiver).

19 Claims, 3 Drawing Sheets

Related U.S. Application Data

(60) Provisional application No. 62/272,878, filed on Dec. 30, 2015.

(51) Int. Cl.
  *H04W 4/80* (2018.01)
  *H02J 50/20* (2016.01)
  *H02J 50/80* (2016.01)

(58) Field of Classification Search
  CPC ............ H02J 50/27; H02J 50/80; H02J 50/90; H04Q 2209/40; H04Q 2209/43; H04Q 2209/47; H04Q 2209/88; H04Q 2209/883; H04Q 2209/82; H04Q 2209/823; H04Q 2209/826; H04W 4/005; H04W 52/245; H04W 28/0278; H04L 67/12
  USPC .......................... 320/108; 340/870.01–870.02
  See application file for complete search history.

(56) References Cited

U.S. PATENT DOCUMENTS

| | | |
|---|---|---|
| 3,434,678 A | 3/1969 | Brown et al. |
| 3,696,384 A | 10/1972 | Lester |
| 3,754,269 A | 8/1973 | Clavin |
| 4,101,895 A | 7/1978 | Jones, Jr. |
| 4,360,741 A | 11/1982 | Fitzsimmons et al. |
| 4,944,036 A | 7/1990 | Hyatt |
| 4,995,010 A | 2/1991 | Knight |
| 5,200,759 A | 4/1993 | McGinnis |
| 5,211,471 A | 5/1993 | Rohrs |
| 5,548,292 A | 8/1996 | Hirshfield et al. |
| 5,556,749 A | 9/1996 | Mitsuhashi et al. |
| 5,568,088 A | 10/1996 | Dent et al. |
| 5,646,633 A | 7/1997 | Dahlberg |
| 5,697,063 A | 12/1997 | Kishigami et al. |
| 5,712,642 A | 1/1998 | Hulderman |
| 5,936,527 A | 8/1999 | Isaacman et al. |
| 5,982,139 A | 11/1999 | Parise |
| 6,046,708 A | 4/2000 | MacDonald, Jr. et al. |
| 6,127,799 A | 10/2000 | Krishnan |
| 6,127,942 A | 10/2000 | Welle |
| 6,163,296 A | 12/2000 | Lier et al. |
| 6,289,237 B1 | 9/2001 | Mickle et al. |
| 6,329,908 B1 | 12/2001 | Frecska |
| 6,421,235 B2 | 7/2002 | Ditzik |
| 6,437,685 B2 | 8/2002 | Hanaki |
| 6,456,253 B1 | 9/2002 | Rummeli et al. |
| 6,476,795 B1 | 11/2002 | Derocher et al. |
| 6,501,414 B2 | 12/2002 | Arndt et al. |
| 6,583,723 B2 | 6/2003 | Watanabe et al. |
| 6,597,897 B2 | 7/2003 | Tang |
| 6,615,074 B2 | 9/2003 | Mickle et al. |
| 6,650,376 B1 | 11/2003 | Obitsu |
| 6,664,920 B1 | 12/2003 | Mott et al. |
| 6,798,716 B1 | 9/2004 | Charych |
| 6,803,744 B1 | 10/2004 | Sabo |
| 6,853,197 B1 | 2/2005 | McFarland |
| 6,856,291 B2 | 2/2005 | Mickle et al. |
| 6,911,945 B2 | 6/2005 | Korva |
| 6,960,968 B2 | 11/2005 | Odendaal et al. |
| 6,967,462 B1 | 11/2005 | Landis |
| 6,988,026 B2 | 1/2006 | Breed et al. |
| 7,003,350 B2 | 2/2006 | Denker et al. |
| 7,027,311 B2 | 4/2006 | Vanderelli et al. |
| 7,068,234 B2 | 6/2006 | Sievenpiper |
| 7,068,991 B2 | 6/2006 | Parise |
| 7,183,748 B1 | 2/2007 | Unno et al. |
| 7,196,663 B2 | 3/2007 | Bolzer et al. |
| 7,205,749 B2 | 4/2007 | Hagen et al. |
| 7,222,356 B1 | 5/2007 | Yonezawa et al. |
| 7,274,334 B2 | 9/2007 | o'Riordan et al. |
| 7,274,336 B2 | 9/2007 | Carson |
| 7,351,975 B2 | 4/2008 | Brady et al. |
| 7,359,730 B2 | 4/2008 | Dennis et al. |
| 7,392,068 B2 | 6/2008 | Dayan |
| 7,403,803 B2 | 7/2008 | Mickle et al. |
| 7,443,057 B2 | 10/2008 | Nunally |
| 7,451,839 B2 | 11/2008 | Perlman |
| 7,463,201 B2 | 12/2008 | Chiang et al. |
| 7,471,247 B2 | 12/2008 | Saily |
| 7,535,195 B1 | 5/2009 | Horovitz et al. |
| 7,614,556 B2 | 11/2009 | Overhultz et al. |
| 7,639,994 B2 | 12/2009 | Greene et al. |
| 7,643,312 B2 | 1/2010 | Vanderelli et al. |
| 7,652,577 B1 | 1/2010 | Madhow et al. |
| 7,679,576 B2 | 3/2010 | Riedel et al. |
| 7,702,771 B2 | 4/2010 | Ewing et al. |
| 7,786,419 B2 | 8/2010 | Hyde et al. |
| 7,812,771 B2 | 10/2010 | Greene et al. |
| 7,830,312 B2 | 11/2010 | Choudhury et al. |
| 7,844,306 B2 | 11/2010 | Shearer et al. |
| 7,868,482 B2 | 1/2011 | Greene et al. |
| 7,898,105 B2 | 3/2011 | Greene et al. |
| 7,904,117 B2 | 3/2011 | Doan et al. |
| 7,911,386 B1 | 3/2011 | Ito et al. |
| 7,925,308 B2 | 4/2011 | Greene et al. |
| 7,948,208 B2 | 5/2011 | Partovi et al. |
| 8,055,003 B2 | 11/2011 | Mittleman et al. |
| 8,070,595 B2 | 12/2011 | Alderucci et al. |
| 8,072,380 B2 | 12/2011 | Crouch |
| 8,092,301 B2 | 1/2012 | Alderucci et al. |
| 8,099,140 B2 | 1/2012 | Arai |
| 8,115,448 B2 | 2/2012 | John |
| 8,159,090 B2 | 4/2012 | Greene et al. |
| 8,159,364 B2 | 4/2012 | Zeine |
| 8,180,286 B2 | 5/2012 | Yamasuge |
| 8,228,194 B2 | 7/2012 | Mickle |
| 8,234,509 B2 | 7/2012 | Gioscia et al. |
| 8,264,101 B2 | 9/2012 | Hyde et al. |
| 8,264,291 B2 | 9/2012 | Morita |
| 8,276,325 B2 | 10/2012 | Clifton et al. |
| 8,278,784 B2 | 10/2012 | Cook et al. |
| 8,284,101 B2 | 10/2012 | Fusco |
| 8,310,201 B1 | 11/2012 | Wright |
| 8,338,991 B2 | 12/2012 | Von Novak et al. |
| 8,362,745 B2 | 1/2013 | Tinaphong |
| 8,380,255 B2 | 2/2013 | Shearer et al. |
| 8,384,600 B2 | 2/2013 | Huang et al. |
| 7,191,013 B1 | 3/2013 | Miranda et al. |
| 8,410,953 B2 | 4/2013 | Zeine |
| 8,411,963 B2 | 4/2013 | Luff |
| 8,432,062 B2 | 4/2013 | Greene et al. |
| 8,432,071 B2 | 4/2013 | Huang et al. |
| 8,446,248 B2 | 5/2013 | Zeine |
| 8,447,234 B2 | 5/2013 | Cook et al. |
| 8,451,189 B1 | 5/2013 | Fluhler |
| 8,452,235 B2 | 5/2013 | Kirby et al. |
| 8,457,656 B2 | 6/2013 | Perkins et al. |
| 8,461,817 B2 | 6/2013 | Martin et al. |
| 8,467,733 B2 | 6/2013 | Leabman |
| 8,497,601 B2 | 7/2013 | Hall et al. |
| 8,497,658 B2 | 7/2013 | Von Novak et al. |
| 8,552,597 B2 | 8/2013 | Song et al. |
| 8,558,661 B2 | 10/2013 | Zeine |
| 8,560,026 B2 | 10/2013 | Chanterac |
| 8,604,746 B2 | 12/2013 | Lee |
| 8,614,643 B2 | 12/2013 | Leabman |
| 8,621,245 B2 | 12/2013 | Shearer et al. |
| 8,626,249 B2 | 1/2014 | Kuusilinna et al. |
| 8,629,576 B2 | 1/2014 | Levine |
| 8,653,966 B2 | 2/2014 | Rao et al. |
| 8,674,551 B2 | 3/2014 | Low et al. |
| 8,686,685 B2 | 4/2014 | Moshfeghi |
| 8,712,355 B2 | 4/2014 | Black et al. |
| 8,712,485 B2 | 4/2014 | Tam |
| 8,718,773 B2 | 5/2014 | Wills et al. |
| 8,729,737 B2 | 5/2014 | Schatz et al. |
| 8,736,228 B1 | 5/2014 | Freed et al. |
| 8,760,113 B2 | 6/2014 | Keating |
| 8,770,482 B2 | 7/2014 | Ackermann et al. |
| 8,772,960 B2 | 7/2014 | Yoshida |

(56) References Cited

U.S. PATENT DOCUMENTS

| | | |
|---|---|---|
| 8,823,319 B2 | 9/2014 | Von Novak, III et al. |
| 8,832,646 B1 | 9/2014 | Wendling |
| 8,854,176 B2 | 10/2014 | Zeine |
| 8,860,364 B2 | 10/2014 | Low et al. |
| 8,897,770 B1 | 11/2014 | Frolov et al. |
| 8,903,456 B2 | 12/2014 | Chu et al. |
| 8,917,057 B2 | 12/2014 | Hui |
| 8,923,189 B2 | 12/2014 | Leabman |
| 8,928,544 B2 | 1/2015 | Massie et al. |
| 8,937,408 B2 | 1/2015 | Ganem et al. |
| 8,946,940 B2 | 2/2015 | Kim et al. |
| 8,963,486 B2 | 2/2015 | Kirby et al. |
| 8,970,070 B2 | 3/2015 | Sada et al. |
| 8,989,053 B1 | 3/2015 | Skaaksrud et al. |
| 9,000,616 B2 | 4/2015 | Greene et al. |
| 9,001,622 B2 | 4/2015 | Perry |
| 9,006,934 B2 | 4/2015 | Kozakai et al. |
| 9,021,277 B2 | 4/2015 | Shearer et al. |
| 9,030,161 B2 | 5/2015 | Lu et al. |
| 9,059,598 B2 | 6/2015 | Kang et al. |
| 9,059,599 B2 | 6/2015 | Won et al. |
| 9,077,188 B2 | 7/2015 | Moshfeghi |
| 9,083,595 B2 | 7/2015 | Rakib et al. |
| 9,088,216 B2 | 7/2015 | Garrity et al. |
| 9,124,125 B2 | 9/2015 | Leabman et al. |
| 9,130,397 B2 | 9/2015 | Leabman et al. |
| 9,130,602 B2 | 9/2015 | Cook |
| 9,142,998 B2 | 9/2015 | Yu et al. |
| 9,143,000 B2 | 9/2015 | Leabman et al. |
| 9,143,010 B2 | 9/2015 | Urano |
| 9,178,389 B2 | 11/2015 | Hwang |
| 9,225,196 B2 | 12/2015 | Huang et al. |
| 9,240,469 B2 | 1/2016 | Sun et al. |
| 9,242,411 B2 | 1/2016 | Kritchman et al. |
| 9,244,500 B2 | 1/2016 | Cain et al. |
| 9,252,628 B2 | 2/2016 | Leabman et al. |
| 9,270,344 B2 | 2/2016 | Rosenberg |
| 9,282,582 B1 | 3/2016 | Dunsbergen et al. |
| 9,294,840 B1 | 3/2016 | Anderson et al. |
| 9,297,896 B1 | 3/2016 | Andrews |
| 9,318,898 B2 | 4/2016 | John |
| 9,368,020 B1 | 6/2016 | Bell et al. |
| 9,401,977 B1 | 7/2016 | Gaw |
| 9,409,490 B2 | 8/2016 | Kawashima |
| 9,419,335 B2 | 8/2016 | Pintos |
| 9,438,045 B1 | 9/2016 | Leabman |
| 9,438,046 B1 | 9/2016 | Leabman |
| 9,444,283 B2 | 9/2016 | Son et al. |
| 9,450,449 B1 | 9/2016 | Leabman et al. |
| 9,461,502 B2 | 10/2016 | Lee et al. |
| 9,520,725 B2 | 12/2016 | Masaoka et al. |
| 9,520,748 B2 | 12/2016 | Hyde et al. |
| 9,522,270 B2 | 12/2016 | Perryman et al. |
| 9,537,354 B2 | 1/2017 | Bell et al. |
| 9,537,357 B2 | 1/2017 | Leabman |
| 9,537,358 B2 | 1/2017 | Leabman |
| 9,538,382 B2 | 1/2017 | Bell et al. |
| 9,544,640 B2 | 1/2017 | Lau |
| 9,559,553 B2 | 1/2017 | Bae |
| 9,564,773 B2 | 2/2017 | Pogorelik et al. |
| 9,571,974 B2 | 2/2017 | Choi et al. |
| 9,590,317 B2 | 3/2017 | Zimmerman et al. |
| 9,590,444 B2 | 3/2017 | Walley |
| 9,620,996 B2 | 4/2017 | Zeine |
| 9,647,328 B2 | 5/2017 | Dobric |
| 9,706,137 B2 | 7/2017 | Scanlon et al. |
| 9,711,999 B2 | 7/2017 | Hietala et al. |
| 9,723,635 B2 | 8/2017 | Nambord et al. |
| 9,793,758 B2 | 10/2017 | Leabman |
| 9,793,764 B2 | 10/2017 | Perry |
| 9,800,172 B1 | 10/2017 | Leabman |
| 9,806,564 B2 | 10/2017 | Leabman |
| 9,819,230 B2 | 11/2017 | Petras et al. |
| 9,825,674 B1 | 11/2017 | Leabman |
| 9,853,361 B2 | 12/2017 | Chen et al. |
| 9,866,279 B2 | 1/2018 | Bell et al. |
| 9,876,394 B1 | 1/2018 | Leabman |
| 2001/0027876 A1 | 10/2001 | Tsukamoto et al. |
| 2002/0001307 A1 | 1/2002 | Nguyen et al. |
| 2002/0024471 A1 | 2/2002 | Ishitobi |
| 2002/0028655 A1 | 3/2002 | Rosener et al. |
| 2002/0034958 A1 | 3/2002 | Oberschmidt et al. |
| 2002/0054330 A1 | 5/2002 | Jinbo et al. |
| 2002/0065052 A1 | 5/2002 | Pande et al. |
| 2002/0072784 A1 | 6/2002 | Sheppard et al. |
| 2002/0095980 A1 | 7/2002 | Breed et al. |
| 2002/0103447 A1 | 8/2002 | Terry |
| 2002/0133592 A1 | 9/2002 | Matsuda |
| 2002/0172223 A1 | 11/2002 | Stilp |
| 2003/0005759 A1 | 1/2003 | Breed et al. |
| 2003/0058187 A1 | 3/2003 | Billiet et al. |
| 2003/0076274 A1 | 4/2003 | Phelan et al. |
| 2003/0179152 A1 | 9/2003 | Watada et al. |
| 2003/0179573 A1 | 9/2003 | Chun |
| 2003/0192053 A1 | 10/2003 | Sheppard et al. |
| 2004/0019624 A1 | 1/2004 | Sukegawa |
| 2004/0020100 A1 | 2/2004 | O'Brian et al. |
| 2004/0036657 A1 | 2/2004 | Forster et al. |
| 2004/0066251 A1 | 4/2004 | Eleftheriades et al. |
| 2004/0107641 A1 | 6/2004 | Walton et al. |
| 2004/0113543 A1 | 6/2004 | Daniels |
| 2004/0119675 A1 | 6/2004 | Washio et al. |
| 2004/0130425 A1 | 7/2004 | Dayan et al. |
| 2004/0130442 A1 | 7/2004 | Breed |
| 2004/0142733 A1 | 7/2004 | Parise |
| 2004/0145342 A1 | 7/2004 | Lyon |
| 2004/0196190 A1 | 10/2004 | Mendolia et al. |
| 2004/0203979 A1 | 10/2004 | Attar et al. |
| 2004/0207559 A1 | 10/2004 | Milosavljevic |
| 2004/0218759 A1 | 11/2004 | Yacobi |
| 2004/0259604 A1 | 12/2004 | Mickle et al. |
| 2004/0263124 A1 | 12/2004 | Wieck et al. |
| 2005/0007276 A1 | 1/2005 | Barrick et al. |
| 2005/0030118 A1 | 2/2005 | Wang |
| 2005/0046584 A1 | 3/2005 | Breed |
| 2005/0055316 A1 | 3/2005 | Williams |
| 2005/0077872 A1 | 4/2005 | Single |
| 2005/0093766 A1 | 5/2005 | Turner |
| 2005/0116683 A1 | 6/2005 | Cheng |
| 2005/0117660 A1 | 6/2005 | Vialle et al. |
| 2005/0134517 A1 | 6/2005 | Gottl |
| 2005/0171411 A1 | 8/2005 | KenKnight |
| 2005/0198673 A1 | 9/2005 | Kit et al. |
| 2005/0227619 A1 | 10/2005 | Lee et al. |
| 2005/0232469 A1 | 10/2005 | Schofield |
| 2005/0237249 A1 | 10/2005 | Nagel |
| 2005/0237258 A1 | 10/2005 | Abramov et al. |
| 2005/0282591 A1 | 12/2005 | Shaff |
| 2006/0013335 A1 | 1/2006 | Leabman |
| 2006/0019712 A1 | 1/2006 | Choi |
| 2006/0030279 A1 | 2/2006 | Leabman et al. |
| 2006/0033674 A1 | 2/2006 | Essig, Jr. et al. |
| 2006/0071308 A1 | 4/2006 | Tang et al. |
| 2006/0092079 A1 | 5/2006 | de Rochemont |
| 2006/0094425 A1 | 5/2006 | Mickle et al. |
| 2006/0113955 A1 | 6/2006 | Nunally |
| 2006/0119532 A1 | 6/2006 | Yun et al. |
| 2006/0136004 A1 | 6/2006 | Cowan et al. |
| 2006/0160517 A1 | 7/2006 | Yoon |
| 2006/0183473 A1 | 8/2006 | Ukon |
| 2006/0190063 A1 | 8/2006 | Kanzius |
| 2006/0192913 A1 | 8/2006 | Shutou et al. |
| 2006/0199620 A1 | 9/2006 | Greene et al. |
| 2006/0238365 A1 | 10/2006 | Vecchione et al. |
| 2006/0266564 A1 | 11/2006 | Perlman et al. |
| 2006/0266917 A1 | 11/2006 | Baldis et al. |
| 2006/0278706 A1 | 12/2006 | Hatakayama et al. |
| 2006/0284593 A1 | 12/2006 | Nagy et al. |
| 2006/0287094 A1 | 12/2006 | Mahaffey et al. |
| 2007/0007821 A1 | 1/2007 | Rossetti |
| 2007/0019693 A1 | 1/2007 | Graham |
| 2007/0021140 A1 | 1/2007 | Keyes |
| 2007/0060185 A1 | 3/2007 | Simon et al. |
| 2007/0070490 A1 | 3/2007 | Tsunoda et al. |

(56) References Cited

U.S. PATENT DOCUMENTS

| | | |
|---|---|---|
| 2007/0090997 A1 | 4/2007 | Brown et al. |
| 2007/0093269 A1 | 4/2007 | Leabman et al. |
| 2007/0097653 A1 | 5/2007 | Gilliland et al. |
| 2007/0103110 A1 | 5/2007 | Sagoo |
| 2007/0106894 A1 | 5/2007 | Zhang |
| 2007/0109121 A1 | 5/2007 | Cohen |
| 2007/0139000 A1 | 6/2007 | Kozuma |
| 2007/0149162 A1 | 6/2007 | Greene et al. |
| 2007/0164868 A1 | 7/2007 | Deavours et al. |
| 2007/0173196 A1 | 7/2007 | Gallic |
| 2007/0173214 A1 | 7/2007 | Mickle et al. |
| 2007/0178857 A1 | 8/2007 | Greene et al. |
| 2007/0178945 A1 | 8/2007 | Cook et al. |
| 2007/0182367 A1 | 8/2007 | Partovi |
| 2007/0191074 A1 | 8/2007 | Harrist et al. |
| 2007/0191075 A1 | 8/2007 | Greene et al. |
| 2007/0197281 A1 | 8/2007 | Stronach |
| 2007/0210960 A1 | 9/2007 | Rofougaran et al. |
| 2007/0222681 A1 | 9/2007 | Greene et al. |
| 2007/0257634 A1 | 11/2007 | Leschin et al. |
| 2007/0273486 A1 | 11/2007 | Shiotsu |
| 2007/0296639 A1 | 12/2007 | Hook et al. |
| 2007/0298846 A1 | 12/2007 | Greene et al. |
| 2008/0014897 A1 | 1/2008 | Cook et al. |
| 2008/0024376 A1 | 1/2008 | Norris et al. |
| 2008/0048917 A1 | 2/2008 | Achour et al. |
| 2008/0062062 A1 | 3/2008 | Borau et al. |
| 2008/0062255 A1 | 3/2008 | Gal |
| 2008/0067874 A1 | 3/2008 | Tseng |
| 2008/0074324 A1 | 3/2008 | Puzella et al. |
| 2008/0089277 A1 | 4/2008 | Aledander et al. |
| 2008/0110263 A1 | 5/2008 | Klessel et al. |
| 2008/0113816 A1 | 5/2008 | Mahaffey et al. |
| 2008/0122297 A1 | 5/2008 | Arai |
| 2008/0123383 A1 | 5/2008 | Shionoiri |
| 2008/0129536 A1 | 6/2008 | Randall et al. |
| 2008/0140278 A1 | 6/2008 | Breed |
| 2008/0169910 A1 | 7/2008 | Greene et al. |
| 2008/0197802 A1 | 8/2008 | Onishi |
| 2008/0204342 A1 | 8/2008 | Kharadly |
| 2008/0204350 A1 | 8/2008 | Tam et al. |
| 2008/0210762 A1 | 9/2008 | Osada et al. |
| 2008/0211458 A1 | 9/2008 | Lawther et al. |
| 2008/0233890 A1 | 9/2008 | Baker |
| 2008/0248758 A1 | 10/2008 | Schedelbeck et al. |
| 2008/0248846 A1 | 10/2008 | Stronach et al. |
| 2008/0258993 A1 | 10/2008 | Gummalla et al. |
| 2008/0266191 A1 | 10/2008 | Hilgers |
| 2008/0278378 A1 | 11/2008 | Chang et al. |
| 2008/0309452 A1 | 12/2008 | Zeine |
| 2009/0002493 A1 | 1/2009 | Kates |
| 2009/0019183 A1 | 1/2009 | Wu et al. |
| 2009/0036065 A1 | 2/2009 | Siu |
| 2009/0047998 A1 | 2/2009 | Alberth, Jr. |
| 2009/0058354 A1 | 3/2009 | Harrison |
| 2009/0058361 A1 | 3/2009 | John |
| 2009/0058731 A1 | 3/2009 | Geary et al. |
| 2009/0067208 A1 | 3/2009 | Martin et al. |
| 2009/0096412 A1 | 4/2009 | Huang |
| 2009/0096413 A1 | 4/2009 | Partovi |
| 2009/0102292 A1 | 4/2009 | Cook et al. |
| 2009/0102296 A1 | 4/2009 | Greene et al. |
| 2009/0108679 A1 | 4/2009 | Porwal |
| 2009/0122847 A1 | 5/2009 | Nysen et al. |
| 2009/0128262 A1 | 5/2009 | Lee et al. |
| 2009/0157911 A1 | 6/2009 | Aihara |
| 2009/0200985 A1 | 8/2009 | Zane et al. |
| 2009/0206791 A1 | 8/2009 | Jung |
| 2009/0207090 A1 | 8/2009 | Pettus et al. |
| 2009/0207092 A1 | 8/2009 | Nysen et al. |
| 2009/0218884 A1 | 9/2009 | Soar |
| 2009/0218891 A1 | 9/2009 | McCollough |
| 2009/0219903 A1 | 9/2009 | Alamouti et al. |
| 2009/0243397 A1 | 10/2009 | Cook et al. |
| 2009/0264069 A1 | 10/2009 | Yamasuge |
| 2009/0280866 A1 | 11/2009 | Lo et al. |
| 2009/0281678 A1 | 11/2009 | Wakamatsu |
| 2009/0284082 A1 | 11/2009 | Mohammadian |
| 2009/0284083 A1 | 11/2009 | Karalis et al. |
| 2009/0284220 A1 | 11/2009 | Toncich et al. |
| 2009/0284227 A1 | 11/2009 | Mohammadian et al. |
| 2009/0284325 A1 | 11/2009 | Rossiter et al. |
| 2009/0286475 A1 | 11/2009 | Toncich et al. |
| 2009/0291634 A1 | 11/2009 | Saarisalo |
| 2009/0299175 A1 | 12/2009 | Bernstein et al. |
| 2009/0308936 A1 | 12/2009 | Nitzan et al. |
| 2009/0312046 A1 | 12/2009 | Clevenger et al. |
| 2009/0315412 A1 | 12/2009 | Yamamoto et al. |
| 2009/0322281 A1 | 12/2009 | Kamijo et al. |
| 2010/0001683 A1 | 1/2010 | Huang et al. |
| 2010/0007307 A1 | 1/2010 | Baarman et al. |
| 2010/0007569 A1 | 1/2010 | Sim et al. |
| 2010/0019686 A1 | 1/2010 | Gutierrez, Jr. |
| 2010/0019908 A1 | 1/2010 | Cho et al. |
| 2010/0026605 A1 | 2/2010 | Yang et al. |
| 2010/0027379 A1 | 2/2010 | Saulnier et al. |
| 2010/0029383 A1 | 2/2010 | Dai |
| 2010/0033021 A1 | 2/2010 | Bennett |
| 2010/0033390 A1 | 2/2010 | Alamouti et al. |
| 2010/0034238 A1 | 2/2010 | Bennett |
| 2010/0041453 A1 | 2/2010 | Grimm, Jr. |
| 2010/0044123 A1 | 2/2010 | Perlman et al. |
| 2010/0054200 A1 | 3/2010 | Tsai |
| 2010/0060534 A1 | 3/2010 | Oodachi |
| 2010/0066631 A1 | 3/2010 | Puzella et al. |
| 2010/0075607 A1 | 3/2010 | Hosoya |
| 2010/0079005 A1 | 4/2010 | Hyde et al. |
| 2010/0082193 A1 | 4/2010 | Chiappetta |
| 2010/0087227 A1 | 4/2010 | Francos et al. |
| 2010/0090524 A1 | 4/2010 | Obayashi |
| 2010/0090656 A1 | 4/2010 | Shearer et al. |
| 2010/0109443 A1 | 5/2010 | Cook et al. |
| 2010/0117926 A1 | 5/2010 | DeJean, II |
| 2010/0119234 A1 | 5/2010 | Suematsu et al. |
| 2010/0123618 A1 | 5/2010 | Martin et al. |
| 2010/0123624 A1 | 5/2010 | Minear et al. |
| 2010/0127660 A1 | 5/2010 | Cook et al. |
| 2010/0142418 A1 | 6/2010 | Nishioka et al. |
| 2010/0142509 A1 | 6/2010 | Zhu et al. |
| 2010/0148723 A1 | 6/2010 | Cook et al. |
| 2010/0151808 A1 | 6/2010 | Toncich et al. |
| 2010/0156721 A1 | 6/2010 | Alamouti et al. |
| 2010/0156741 A1 | 6/2010 | Vazquez et al. |
| 2010/0164296 A1 | 7/2010 | Kurs et al. |
| 2010/0164433 A1 | 7/2010 | Janefalker et al. |
| 2010/0171461 A1 | 7/2010 | Baarman et al. |
| 2010/0174629 A1 | 7/2010 | Taylor et al. |
| 2010/0176934 A1 | 7/2010 | Chou et al. |
| 2010/0181961 A1 | 7/2010 | Novak et al. |
| 2010/0181964 A1 | 7/2010 | Huggins et al. |
| 2010/0194206 A1 | 8/2010 | Burdo et al. |
| 2010/0201189 A1 | 8/2010 | Kirby et al. |
| 2010/0201201 A1 | 8/2010 | Mobarhan et al. |
| 2010/0201314 A1 | 8/2010 | Toncich et al. |
| 2010/0207572 A1 | 8/2010 | Kirby et al. |
| 2010/0210233 A1 | 8/2010 | Cook et al. |
| 2010/0213895 A1 | 8/2010 | Keating et al. |
| 2010/0214177 A1 | 8/2010 | Parsche |
| 2010/0222010 A1 | 9/2010 | Ozaki et al. |
| 2010/0227570 A1 | 9/2010 | Hendin |
| 2010/0231470 A1 | 9/2010 | Lee et al. |
| 2010/0237709 A1 | 9/2010 | Hall et al. |
| 2010/0244576 A1 | 9/2010 | Hillan et al. |
| 2010/0256831 A1 | 10/2010 | Abramo et al. |
| 2010/0259110 A1 | 10/2010 | Kurs et al. |
| 2010/0259447 A1 | 10/2010 | Crouch |
| 2010/0264747 A1 | 10/2010 | Hall et al. |
| 2010/0277003 A1 | 11/2010 | Von Novak et al. |
| 2010/0277121 A1 | 11/2010 | Hall et al. |
| 2010/0279606 A1 | 11/2010 | Hillan et al. |
| 2010/0289341 A1 | 11/2010 | Ozaki et al. |
| 2010/0295372 A1 | 11/2010 | Hyde et al. |
| 2010/0308767 A1 | 12/2010 | Rofougaran et al. |
| 2010/0309079 A1 | 12/2010 | Rofougaran et al. |

(56) References Cited

U.S. PATENT DOCUMENTS

| | | |
|---|---|---|
| 2010/0309088 A1 | 12/2010 | Hyvonen et al. |
| 2010/0315045 A1* | 12/2010 | Zeine .................. H02J 7/025 320/137 |
| 2010/0316163 A1 | 12/2010 | Forenza et al. |
| 2010/0327766 A1 | 12/2010 | Recker et al. |
| 2011/0013198 A1 | 1/2011 | Shirley |
| 2011/0018360 A1 | 1/2011 | Baarman et al. |
| 2011/0028114 A1 | 2/2011 | Kerselaers |
| 2011/0031928 A1 | 2/2011 | Soar |
| 2011/0032149 A1 | 2/2011 | Leabman |
| 2011/0032866 A1 | 2/2011 | Leabman |
| 2011/0034190 A1 | 2/2011 | Leabman |
| 2011/0034191 A1 | 2/2011 | Leabman |
| 2011/0043047 A1 | 2/2011 | Karalis et al. |
| 2011/0043163 A1 | 2/2011 | Baarman et al. |
| 2011/0043327 A1 | 2/2011 | Baarman et al. |
| 2011/0050166 A1 | 3/2011 | Cook et al. |
| 2011/0055037 A1 | 3/2011 | Hayashigawa et al. |
| 2011/0056215 A1 | 3/2011 | Ham |
| 2011/0057607 A1 | 3/2011 | Carobolante |
| 2011/0062788 A1 | 3/2011 | Chen et al. |
| 2011/0074342 A1 | 3/2011 | MacLaughlin |
| 2011/0074349 A1 | 3/2011 | Ghovanloo |
| 2011/0074620 A1 | 3/2011 | Wintermantel |
| 2011/0078092 A1 | 3/2011 | Kim et al. |
| 2011/0090126 A1 | 4/2011 | Szini et al. |
| 2011/0109167 A1 | 5/2011 | Park et al. |
| 2011/0114401 A1 | 5/2011 | Kanno et al. |
| 2011/0115303 A1 | 5/2011 | Baarman et al. |
| 2011/0115432 A1 | 5/2011 | El-Maleh |
| 2011/0115605 A1 | 5/2011 | Dimig et al. |
| 2011/0121660 A1 | 5/2011 | Azancot et al. |
| 2011/0122018 A1 | 5/2011 | Tarng et al. |
| 2011/0122026 A1 | 5/2011 | DeLaquil et al. |
| 2011/0127845 A1 | 6/2011 | Walley et al. |
| 2011/0127952 A1 | 6/2011 | Walley et al. |
| 2011/0133655 A1 | 6/2011 | Recker et al. |
| 2011/0133691 A1 | 6/2011 | Hautanen |
| 2011/0148578 A1 | 6/2011 | Aloi et al. |
| 2011/0151789 A1 | 6/2011 | Viglione et al. |
| 2011/0154429 A1 | 6/2011 | Stantchev |
| 2011/0156494 A1 | 6/2011 | Mashinsky |
| 2011/0156640 A1 | 6/2011 | Moshfeghi |
| 2011/0163128 A1 | 7/2011 | Taguchi et al. |
| 2011/0175455 A1 | 7/2011 | Hashiguchi |
| 2011/0175461 A1 | 7/2011 | Tinaphong |
| 2011/0181120 A1 | 7/2011 | Liu et al. |
| 2011/0182245 A1 | 7/2011 | Malkamaki et al. |
| 2011/0184842 A1 | 7/2011 | Melen |
| 2011/0188207 A1 | 8/2011 | Won et al. |
| 2011/0194543 A1 | 8/2011 | Zhao et al. |
| 2011/0195722 A1 | 8/2011 | Walter et al. |
| 2011/0199046 A1 | 8/2011 | Tsai et al. |
| 2011/0215086 A1 | 9/2011 | Yeh |
| 2011/0217923 A1 | 9/2011 | Ma |
| 2011/0220634 A1 | 9/2011 | Yeh |
| 2011/0221389 A1 | 9/2011 | Won et al. |
| 2011/0222272 A1 | 9/2011 | Yeh |
| 2011/0243040 A1 | 10/2011 | Khan et al. |
| 2011/0243050 A1 | 10/2011 | Yanover |
| 2011/0244913 A1 | 10/2011 | Kim et al. |
| 2011/0248573 A1 | 10/2011 | Kanno et al. |
| 2011/0248575 A1 | 10/2011 | Kim et al. |
| 2011/0249678 A1 | 10/2011 | Bonicatto |
| 2011/0254377 A1 | 10/2011 | Widmer et al. |
| 2011/0254503 A1 | 10/2011 | Widmer et al. |
| 2011/0259953 A1 | 10/2011 | Baarman et al. |
| 2011/0273977 A1 | 11/2011 | Shapira et al. |
| 2011/0278941 A1 | 11/2011 | Krishna et al. |
| 2011/0279226 A1 | 11/2011 | Chen et al. |
| 2011/0281535 A1 | 11/2011 | Low et al. |
| 2011/0282415 A1 | 11/2011 | Eckhoff et al. |
| 2011/0285213 A1 | 11/2011 | Kowalewski |
| 2011/0286374 A1 | 11/2011 | Shin et al. |
| 2011/0291489 A1 | 12/2011 | Tsai et al. |
| 2011/0302078 A1 | 12/2011 | Failing |
| 2011/0304216 A1 | 12/2011 | Baarman |
| 2011/0304437 A1 | 12/2011 | Beeler |
| 2011/0304521 A1 | 12/2011 | Ando et al. |
| 2012/0013196 A1 | 1/2012 | Kim et al. |
| 2012/0013198 A1 | 1/2012 | Uramoto et al. |
| 2012/0013296 A1 | 1/2012 | Heydari et al. |
| 2012/0019419 A1 | 1/2012 | Prat et al. |
| 2012/0043887 A1 | 2/2012 | Mesibov |
| 2012/0051109 A1 | 3/2012 | Kim et al. |
| 2012/0051294 A1 | 3/2012 | Guillouard |
| 2012/0056486 A1 | 3/2012 | Endo et al. |
| 2012/0056741 A1 | 3/2012 | Zhu et al. |
| 2012/0068906 A1 | 3/2012 | Asher et al. |
| 2012/0074891 A1 | 3/2012 | Anderson et al. |
| 2012/0080957 A1 | 4/2012 | Cooper et al. |
| 2012/0086284 A1 | 4/2012 | Capanella et al. |
| 2012/0095617 A1 | 4/2012 | Martin et al. |
| 2012/0098350 A1 | 4/2012 | Campanella et al. |
| 2012/0098485 A1 | 4/2012 | Kang et al. |
| 2012/0099675 A1 | 4/2012 | Kitamura et al. |
| 2012/0103562 A1 | 5/2012 | Clayton |
| 2012/0104849 A1 | 5/2012 | Jackson |
| 2012/0105252 A1 | 5/2012 | Wang |
| 2012/0112532 A1 | 5/2012 | Kesler et al. |
| 2012/0119914 A1 | 5/2012 | Uchida |
| 2012/0126743 A1 | 5/2012 | Rivers, Jr. |
| 2012/0132647 A1 | 5/2012 | Beverly et al. |
| 2012/0133214 A1 | 5/2012 | Yun et al. |
| 2012/0146426 A1 | 6/2012 | Sabo |
| 2012/0146576 A1 | 6/2012 | Partovi |
| 2012/0146577 A1 | 6/2012 | Tanabe |
| 2012/0147802 A1 | 6/2012 | Ukita et al. |
| 2012/0149307 A1 | 6/2012 | Terada et al. |
| 2012/0150670 A1 | 6/2012 | Taylor et al. |
| 2012/0153894 A1 | 6/2012 | Widmer et al. |
| 2012/0157019 A1 | 6/2012 | Li |
| 2012/0161531 A1 | 6/2012 | Kim et al. |
| 2012/0161544 A1 | 6/2012 | Kashiwagi et al. |
| 2012/0169276 A1 | 7/2012 | Wang |
| 2012/0169278 A1 | 7/2012 | Choi |
| 2012/0173418 A1 | 7/2012 | Beardsmore et al. |
| 2012/0179004 A1 | 7/2012 | Roesicke et al. |
| 2012/0181973 A1 | 7/2012 | Lyden |
| 2012/0182427 A1 | 7/2012 | Marshall |
| 2012/0187851 A1 | 8/2012 | Huggins et al. |
| 2012/0193999 A1 | 8/2012 | Zeine |
| 2012/0200399 A1 | 8/2012 | Chae |
| 2012/0201153 A1 | 8/2012 | Bharadia et al. |
| 2012/0201173 A1 | 8/2012 | Jian et al. |
| 2012/0206299 A1 | 8/2012 | Valdes-Garcia |
| 2012/0211214 A1 | 8/2012 | Phan |
| 2012/0212072 A1 | 8/2012 | Miyabayashi et al. |
| 2012/0214462 A1 | 8/2012 | Chu et al. |
| 2012/0214536 A1 | 8/2012 | Kim et al. |
| 2012/0228392 A1 | 9/2012 | Cameron et al. |
| 2012/0228956 A1 | 9/2012 | Kamata |
| 2012/0231856 A1 | 9/2012 | Lee et al. |
| 2012/0235636 A1 | 9/2012 | Partovi |
| 2012/0242283 A1 | 9/2012 | Kim et al. |
| 2012/0248886 A1 | 10/2012 | Kesler et al. |
| 2012/0248888 A1 | 10/2012 | Kesler et al. |
| 2012/0248891 A1 | 10/2012 | Drennen |
| 2012/0249051 A1 | 10/2012 | Son et al. |
| 2012/0262002 A1 | 10/2012 | Widmer et al. |
| 2012/0265272 A1 | 10/2012 | Judkins |
| 2012/0267900 A1 | 10/2012 | Huffman et al. |
| 2012/0268238 A1 | 10/2012 | Park et al. |
| 2012/0274154 A1 | 11/2012 | DeLuca |
| 2012/0280650 A1 | 11/2012 | Kim et al. |
| 2012/0286582 A1* | 11/2012 | Kim .................... H02J 5/005 307/104 |
| 2012/0292993 A1 | 11/2012 | Mettler et al. |
| 2012/0293021 A1 | 11/2012 | Teggatz et al. |
| 2012/0293119 A1 | 11/2012 | Park et al. |
| 2012/0299389 A1 | 11/2012 | Lee et al. |
| 2012/0299540 A1* | 11/2012 | Perry .................. H04B 11/00 320/108 |
| 2012/0299541 A1 | 11/2012 | Perry |

(56) References Cited

U.S. PATENT DOCUMENTS

| | | |
|---|---|---|
| 2012/0299542 A1 | 11/2012 | Perry |
| 2012/0300588 A1 | 11/2012 | Perry |
| 2012/0300592 A1 | 11/2012 | Perry |
| 2012/0300593 A1 | 11/2012 | Perry |
| 2012/0306705 A1 | 12/2012 | Sakurai et al. |
| 2012/0306707 A1 | 12/2012 | Yang et al. |
| 2012/0306720 A1 | 12/2012 | Tanmi et al. |
| 2012/0309295 A1 | 12/2012 | Maguire |
| 2012/0309308 A1 | 12/2012 | Kim et al. |
| 2012/0309332 A1 | 12/2012 | Liao |
| 2012/0313449 A1 | 12/2012 | Kurs |
| 2012/0313835 A1 | 12/2012 | Gebretnsae |
| 2012/0326660 A1 | 12/2012 | Lu et al. |
| 2013/0002550 A1 | 1/2013 | Zalewski |
| 2013/0018439 A1 | 1/2013 | Chow et al. |
| 2013/0024059 A1 | 1/2013 | Miller et al. |
| 2013/0026981 A1 | 1/2013 | Van Der Lee |
| 2013/0026982 A1 | 1/2013 | Rothenbaum |
| 2013/0032589 A1 | 2/2013 | Chung |
| 2013/0033571 A1 | 2/2013 | Steen |
| 2013/0038124 A1 | 2/2013 | Newdoll et al. |
| 2013/0038402 A1 | 2/2013 | Karalis et al. |
| 2013/0043738 A1 | 2/2013 | Park et al. |
| 2013/0044035 A1 | 2/2013 | Zhuang |
| 2013/0049471 A1 | 2/2013 | Oleynik |
| 2013/0049475 A1 | 2/2013 | Kim et al. |
| 2013/0049484 A1 | 2/2013 | Weissentern et al. |
| 2013/0057078 A1 | 3/2013 | Lee |
| 2013/0057205 A1 | 3/2013 | Lee et al. |
| 2013/0057210 A1 | 3/2013 | Negaard et al. |
| 2013/0057364 A1 | 3/2013 | Kesler et al. |
| 2013/0058379 A1 | 3/2013 | Kim et al. |
| 2013/0063082 A1 | 3/2013 | Lee et al. |
| 2013/0063143 A1 | 3/2013 | Adalsteinsson et al. |
| 2013/0069444 A1 | 3/2013 | Waffenschmidt et al. |
| 2013/0077650 A1 | 3/2013 | Traxler et al. |
| 2013/0078918 A1 | 3/2013 | Crowley et al. |
| 2013/0082651 A1 | 4/2013 | Park et al. |
| 2013/0082653 A1 | 4/2013 | Lee et al. |
| 2013/0083774 A1 | 4/2013 | Son et al. |
| 2013/0088082 A1 | 4/2013 | Kang et al. |
| 2013/0088090 A1 | 4/2013 | Wu |
| 2013/0088192 A1 | 4/2013 | Eaton |
| 2013/0088331 A1 | 4/2013 | Cho |
| 2013/0093388 A1 | 4/2013 | Partovi |
| 2013/0099389 A1 | 4/2013 | Hong et al. |
| 2013/0099586 A1 | 4/2013 | Kato |
| 2013/0107023 A1 | 5/2013 | Tanaka et al. |
| 2013/0119777 A1 | 5/2013 | Rees |
| 2013/0119929 A1 | 5/2013 | Partovi |
| 2013/0120217 A1 | 5/2013 | Ueda et al. |
| 2013/0132010 A1 | 5/2013 | Winger et al. |
| 2013/0134923 A1 | 5/2013 | Smith |
| 2013/0137455 A1 | 5/2013 | Xia |
| 2013/0141037 A1 | 6/2013 | Jenwatanavet et al. |
| 2013/0148341 A1 | 6/2013 | Williams |
| 2013/0149975 A1 | 6/2013 | Yu et al. |
| 2013/0154387 A1 | 6/2013 | Lee et al. |
| 2013/0155748 A1 | 6/2013 | Sundstrom |
| 2013/0157729 A1 | 6/2013 | Tabe |
| 2013/0162335 A1 | 6/2013 | Kim et al. |
| 2013/0169061 A1 | 7/2013 | Microshnichenko et al. |
| 2013/0169219 A1 | 7/2013 | Gray |
| 2013/0169348 A1 | 7/2013 | Shi |
| 2013/0171939 A1 | 7/2013 | Tian et al. |
| 2013/0175877 A1 | 7/2013 | Abe et al. |
| 2013/0178253 A1 | 7/2013 | Karaoguz |
| 2013/0181881 A1 | 7/2013 | Christie et al. |
| 2013/0187475 A1 | 7/2013 | Vendik |
| 2013/0190031 A1* | 7/2013 | Persson ............... H04W 24/08 455/517 |
| 2013/0193769 A1 | 8/2013 | Mehta et al. |
| 2013/0197320 A1 | 8/2013 | Albert et al. |
| 2013/0200064 A1 | 8/2013 | Alexander |
| 2013/0207477 A1 | 8/2013 | Nam et al. |
| 2013/0207604 A1 | 8/2013 | Zeine |
| 2013/0207879 A1 | 8/2013 | Rada et al. |
| 2013/0210357 A1 | 8/2013 | Qin et al. |
| 2013/0221757 A1 | 8/2013 | Cho et al. |
| 2013/0222201 A1 | 8/2013 | Ma et al. |
| 2013/0234530 A1 | 9/2013 | Miyauchi |
| 2013/0234536 A1 | 9/2013 | Chemishkian et al. |
| 2013/0234658 A1 | 9/2013 | Endo et al. |
| 2013/0241306 A1 | 9/2013 | Aber et al. |
| 2013/0241468 A1 | 9/2013 | Moshfeghi |
| 2013/0241474 A1 | 9/2013 | Moshfeghi |
| 2013/0249478 A1 | 9/2013 | Hirano |
| 2013/0249479 A1 | 9/2013 | Partovi |
| 2013/0250102 A1 | 9/2013 | Scanlon et al. |
| 2013/0254578 A1 | 9/2013 | Huang et al. |
| 2013/0268782 A1 | 10/2013 | Tam et al. |
| 2013/0270923 A1 | 10/2013 | Cook et al. |
| 2013/0278209 A1 | 10/2013 | Von Novak |
| 2013/0285477 A1 | 10/2013 | Lo et al. |
| 2013/0285606 A1 | 10/2013 | Ben-Shalom et al. |
| 2013/0288600 A1 | 10/2013 | Kuusilinna et al. |
| 2013/0288617 A1 | 10/2013 | Kim et al. |
| 2013/0293423 A1 | 11/2013 | Moshfeghi |
| 2013/0307751 A1 | 11/2013 | Yu-Juin et al. |
| 2013/0310020 A1 | 11/2013 | Kazuhiro |
| 2013/0311798 A1 | 11/2013 | Sultenfuss |
| 2013/0328417 A1 | 12/2013 | Takeuchi |
| 2013/0334883 A1 | 12/2013 | Kim et al. |
| 2013/0339108 A1 | 12/2013 | Ryder et al. |
| 2013/0343208 A1 | 12/2013 | Sexton et al. |
| 2013/0343251 A1 | 12/2013 | Zhang |
| 2014/0001846 A1 | 1/2014 | Mosebrook |
| 2014/0001875 A1 | 1/2014 | Nahidipour |
| 2014/0001876 A1 | 1/2014 | Fujiwara et al. |
| 2014/0006017 A1 | 1/2014 | Sen |
| 2014/0008992 A1 | 1/2014 | Leabman |
| 2014/0008993 A1 | 1/2014 | Leabman |
| 2014/0009108 A1 | 1/2014 | Leabman |
| 2014/0009110 A1 | 1/2014 | Lee |
| 2014/0011531 A1 | 1/2014 | Burstrom et al. |
| 2014/0015336 A1 | 1/2014 | Weber et al. |
| 2014/0015344 A1 | 1/2014 | Mohamadi |
| 2014/0021907 A1 | 1/2014 | Yun et al. |
| 2014/0021908 A1 | 1/2014 | McCool |
| 2014/0035524 A1 | 2/2014 | Zeine |
| 2014/0035526 A1 | 2/2014 | Tripathi et al. |
| 2014/0035786 A1 | 2/2014 | Ley |
| 2014/0043248 A1 | 2/2014 | Yeh |
| 2014/0049422 A1 | 2/2014 | Von Novak et al. |
| 2014/0054971 A1 | 2/2014 | Kissin |
| 2014/0055098 A1 | 2/2014 | Lee et al. |
| 2014/0057618 A1 | 2/2014 | Zirwas et al. |
| 2014/0062395 A1 | 3/2014 | Kwon et al. |
| 2014/0082435 A1 | 3/2014 | Kitgawa |
| 2014/0086125 A1 | 3/2014 | Polo et al. |
| 2014/0086592 A1 | 3/2014 | Nakahara et al. |
| 2014/0091756 A1 | 4/2014 | Ofstein et al. |
| 2014/0091968 A1 | 4/2014 | Harel et al. |
| 2014/0103869 A1 | 4/2014 | Radovic |
| 2014/0111147 A1 | 4/2014 | Soar |
| 2014/0113689 A1 | 4/2014 | Lee |
| 2014/0117946 A1 | 5/2014 | Muller et al. |
| 2014/0118140 A1 | 5/2014 | Amis |
| 2014/0128107 A1 | 5/2014 | An |
| 2014/0132210 A1 | 5/2014 | Partovi |
| 2014/0133279 A1 | 5/2014 | Khuri-Yakub |
| 2014/0139034 A1 | 5/2014 | Sankar et al. |
| 2014/0139039 A1 | 5/2014 | Cook et al. |
| 2014/0139180 A1 | 5/2014 | Kim et al. |
| 2014/0141838 A1 | 5/2014 | Cai et al. |
| 2014/0142876 A1 | 5/2014 | John et al. |
| 2014/0143933 A1 | 5/2014 | Low et al. |
| 2014/0145879 A1 | 5/2014 | Pan |
| 2014/0145884 A1 | 5/2014 | Dang et al. |
| 2014/0152117 A1 | 6/2014 | Sanker |
| 2014/0159651 A1 | 6/2014 | Von Novak et al. |
| 2014/0159652 A1 | 6/2014 | Hall et al. |
| 2014/0159662 A1 | 6/2014 | Furui |
| 2014/0159667 A1 | 6/2014 | Kim et al. |

(56) References Cited

U.S. PATENT DOCUMENTS

| | | |
|---|---|---|
| 2014/0169385 A1 | 6/2014 | Hadani et al. |
| 2014/0175893 A1 | 6/2014 | Sengupta et al. |
| 2014/0176054 A1 | 6/2014 | Porat et al. |
| 2014/0176061 A1 | 6/2014 | Cheatham, III et al. |
| 2014/0177399 A1 | 6/2014 | Teng et al. |
| 2014/0184148 A1 | 7/2014 | Van Der Lee et al. |
| 2014/0184155 A1 | 7/2014 | Cha |
| 2014/0184163 A1 | 7/2014 | Das et al. |
| 2014/0184170 A1 | 7/2014 | Jeong |
| 2014/0191568 A1 | 7/2014 | Partovi |
| 2014/0194092 A1 | 7/2014 | Wanstedt et al. |
| 2014/0194095 A1 | 7/2014 | Wanstedt et al. |
| 2014/0206384 A1 | 7/2014 | Kim et al. |
| 2014/0210281 A1 | 7/2014 | Ito et al. |
| 2014/0217955 A1 | 8/2014 | Lin |
| 2014/0217967 A1 | 8/2014 | Zeine et al. |
| 2014/0225805 A1 | 8/2014 | Pan et al. |
| 2014/0232320 A1 | 8/2014 | Ento July et al. |
| 2014/0232610 A1 | 8/2014 | Shigemoto et al. |
| 2014/0239733 A1 | 8/2014 | Mach et al. |
| 2014/0241231 A1 | 8/2014 | Zeine |
| 2014/0245036 A1 | 8/2014 | Oishi |
| 2014/0246416 A1 | 9/2014 | White |
| 2014/0247152 A1 | 9/2014 | Proud |
| 2014/0252813 A1 | 9/2014 | Lee et al. |
| 2014/0252866 A1 | 9/2014 | Walsh et al. |
| 2014/0265725 A1 | 9/2014 | Angle et al. |
| 2014/0265727 A1 | 9/2014 | Berte |
| 2014/0265943 A1 | 9/2014 | Angle et al. |
| 2014/0266025 A1 | 9/2014 | Jakubowski |
| 2014/0266946 A1 | 9/2014 | Bily et al. |
| 2014/0273892 A1 | 9/2014 | Nourbakhsh |
| 2014/0281655 A1 | 9/2014 | Angle et al. |
| 2014/0292090 A1 | 10/2014 | Cordeiro et al. |
| 2014/0300452 A1 | 10/2014 | Rofe et al. |
| 2014/0312706 A1 | 10/2014 | Fiorello et al. |
| 2014/0327320 A1 | 11/2014 | Muhs et al. |
| 2014/0327390 A1 | 11/2014 | Park et al. |
| 2014/0333142 A1 | 11/2014 | Desrosiers |
| 2014/0346860 A1 | 11/2014 | Aubry et al. |
| 2014/0354063 A1 | 12/2014 | Leabman et al. |
| 2014/0354221 A1 | 12/2014 | Leabman et al. |
| 2014/0355718 A1 | 12/2014 | Guan et al. |
| 2014/0357309 A1 | 12/2014 | Leabman et al. |
| 2014/0368048 A1 | 12/2014 | Leabman |
| 2014/0368161 A1 | 12/2014 | Leabman et al. |
| 2014/0368405 A1 | 12/2014 | Ek et al. |
| 2014/0375139 A1 | 12/2014 | Tsukamoto |
| 2014/0375253 A1 | 12/2014 | Leabman et al. |
| 2014/0375255 A1 | 12/2014 | Leabman et al. |
| 2014/0375258 A1 | 12/2014 | Arkhipenkov |
| 2014/0375261 A1 | 12/2014 | Manova-Elssibony et al. |
| 2014/0376646 A1 | 12/2014 | Leabman et al. |
| 2015/0001949 A1 | 1/2015 | Leabman et al. |
| 2015/0002086 A1 | 1/2015 | Matos et al. |
| 2015/0003207 A1 | 1/2015 | Lee et al. |
| 2015/0008980 A1 | 1/2015 | Kim et al. |
| 2015/0011160 A1 | 1/2015 | Uurgovan et al. |
| 2015/0015182 A1 | 1/2015 | Brandtman et al. |
| 2015/0015192 A1 | 1/2015 | Leabamn |
| 2015/0015194 A1 | 1/2015 | Leabman et al. |
| 2015/0015195 A1 | 1/2015 | Leabman et al. |
| 2015/0021990 A1 | 1/2015 | Myer et al. |
| 2015/0022008 A1 | 1/2015 | Leabman et al. |
| 2015/0022009 A1 | 1/2015 | Leabman et al. |
| 2015/0022010 A1 | 1/2015 | Leabman et al. |
| 2015/0023204 A1 | 1/2015 | Wil et al. |
| 2015/0028688 A1 | 1/2015 | Masaoka |
| 2015/0028694 A1 | 1/2015 | Leabman et al. |
| 2015/0028697 A1 | 1/2015 | Leabman et al. |
| 2015/0028875 A1 | 1/2015 | Irie et al. |
| 2015/0029397 A1 | 1/2015 | Leabman et al. |
| 2015/0035378 A1 | 2/2015 | Calhoun et al. |
| 2015/0035715 A1 | 2/2015 | Kim et al. |
| 2015/0041459 A1 | 2/2015 | Leabman et al. |
| 2015/0042264 A1 | 2/2015 | Leabman et al. |
| 2015/0042265 A1 | 2/2015 | Leabman et al. |
| 2015/0044977 A1 | 2/2015 | Ramasamy et al. |
| 2015/0046526 A1 | 2/2015 | Bush et al. |
| 2015/0061404 A1 | 3/2015 | Lamenza et al. |
| 2015/0076917 A1 | 3/2015 | Leabman et al. |
| 2015/0076927 A1 | 3/2015 | Leabman et al. |
| 2015/0077036 A1 | 3/2015 | Leabman et al. |
| 2015/0077037 A1 | 3/2015 | Leabman et al. |
| 2015/0091520 A1 | 4/2015 | Blum et al. |
| 2015/0091706 A1 | 4/2015 | Chemishkian et al. |
| 2015/0097663 A1 | 4/2015 | Sloo et al. |
| 2015/0102681 A1 | 4/2015 | Leabman et al. |
| 2015/0102764 A1 | 4/2015 | Leabman et al. |
| 2015/0102769 A1 | 4/2015 | Leabman et al. |
| 2015/0102973 A1 | 4/2015 | Hand et al. |
| 2015/0108848 A1 | 4/2015 | Joehren |
| 2015/0109181 A1 | 4/2015 | Hyde et al. |
| 2015/0115877 A1 | 4/2015 | Aria et al. |
| 2015/0115878 A1 | 4/2015 | Park |
| 2015/0123483 A1 | 5/2015 | Leabman et al. |
| 2015/0123496 A1 | 5/2015 | Leabman et al. |
| 2015/0128733 A1 | 5/2015 | Taylor et al. |
| 2015/0130285 A1 | 5/2015 | Leabman et al. |
| 2015/0130293 A1 | 5/2015 | Hajimiri et al. |
| 2015/0148664 A1 | 5/2015 | Stolka et al. |
| 2015/0155737 A1 | 6/2015 | Mayo |
| 2015/0155738 A1 | 6/2015 | Leabman et al. |
| 2015/0162751 A1 | 6/2015 | Leabman et al. |
| 2015/0162779 A1 | 6/2015 | Lee et al. |
| 2015/0171513 A1 | 6/2015 | Chen et al. |
| 2015/0171656 A1 | 6/2015 | Leabman et al. |
| 2015/0171658 A1 | 6/2015 | Manova-Elssibony et al. |
| 2015/0171931 A1 | 6/2015 | Won et al. |
| 2015/0177326 A1 | 6/2015 | Chakraborty et al. |
| 2015/0180133 A1 | 6/2015 | Hunt |
| 2015/0181117 A1 | 6/2015 | Park et al. |
| 2015/0187491 A1 | 7/2015 | Yanagawa |
| 2015/0188352 A1 | 7/2015 | Peek et al. |
| 2015/0199665 A1 | 7/2015 | Chu |
| 2015/0207333 A1 | 7/2015 | Baarman et al. |
| 2015/0207542 A1 | 7/2015 | Zeine |
| 2015/0222126 A1 | 8/2015 | Leabman et al. |
| 2015/0233987 A1 | 8/2015 | Von Novak, III et al. |
| 2015/0234144 A1 | 8/2015 | Cameron et al. |
| 2015/0236520 A1 | 8/2015 | Baarman |
| 2015/0244070 A1 | 8/2015 | Cheng et al. |
| 2015/0244080 A1 | 8/2015 | Gregoire |
| 2015/0244187 A1 | 8/2015 | Horie |
| 2015/0244201 A1 | 8/2015 | Chu |
| 2015/0244341 A1 | 8/2015 | Ritter et al. |
| 2015/0249484 A1 | 9/2015 | Mach et al. |
| 2015/0255989 A1 | 9/2015 | Walley et al. |
| 2015/0256097 A1 | 9/2015 | Gudan et al. |
| 2015/0263534 A1 | 9/2015 | Lee et al. |
| 2015/0263548 A1 | 9/2015 | Cooper |
| 2015/0270741 A1 | 9/2015 | Leabman et al. |
| 2015/0280484 A1 | 10/2015 | Radziemski et al. |
| 2015/0288438 A1 | 10/2015 | Maltsev et al. |
| 2015/0311585 A1 | 10/2015 | Church et al. |
| 2015/0312721 A1 | 10/2015 | Singh |
| 2015/0318729 A1 | 11/2015 | Leabman |
| 2015/0326024 A1 | 11/2015 | Bell et al. |
| 2015/0326025 A1 | 11/2015 | Bell et al. |
| 2015/0326063 A1 | 11/2015 | Leabman et al. |
| 2015/0326068 A1 | 11/2015 | Bell et al. |
| 2015/0326069 A1 | 11/2015 | Petras et al. |
| 2015/0326070 A1 | 11/2015 | Petras et al. |
| 2015/0326072 A1 | 11/2015 | Petras et al. |
| 2015/0326142 A1 | 11/2015 | Petras et al. |
| 2015/0326143 A1 | 11/2015 | Petras et al. |
| 2015/0327085 A1 | 11/2015 | Hadani |
| 2015/0333528 A1 | 11/2015 | Leabman |
| 2015/0333529 A1 | 11/2015 | Leabman |
| 2015/0333573 A1 | 11/2015 | Leabman |
| 2015/0333800 A1 | 11/2015 | Perry et al. |
| 2015/0340759 A1 | 11/2015 | Bridgelall et al. |
| 2015/0340903 A1 | 11/2015 | Bell et al. |
| 2015/0340909 A1 | 11/2015 | Bell et al. |

(56) References Cited

U.S. PATENT DOCUMENTS

| | | |
|---|---|---|
| 2015/0340910 A1 | 11/2015 | Petras et al. |
| 2015/0340911 A1 | 11/2015 | Bell et al. |
| 2015/0341087 A1 | 11/2015 | Moore et al. |
| 2015/0349574 A1 | 12/2015 | Leabman |
| 2015/0358222 A1 | 12/2015 | Berger et al. |
| 2015/0365137 A1 | 12/2015 | Miller et al. |
| 2015/0365138 A1 | 12/2015 | Miller et al. |
| 2016/0005068 A1 | 1/2016 | Im et al. |
| 2016/0012695 A1 | 1/2016 | Bell et al. |
| 2016/0013656 A1 | 1/2016 | Bell et al. |
| 2016/0013677 A1 | 1/2016 | Bell et al. |
| 2016/0013678 A1 | 1/2016 | Bell et al. |
| 2016/0013855 A1 | 1/2016 | Campos |
| 2016/0020636 A1 | 1/2016 | Khlat |
| 2016/0020647 A1 | 1/2016 | Leabman et al. |
| 2016/0020649 A1 | 1/2016 | Bell et al. |
| 2016/0020830 A1 | 1/2016 | Bell et al. |
| 2016/0042206 A1 | 2/2016 | Pesavento et al. |
| 2016/0054395 A1 | 2/2016 | Bell et al. |
| 2016/0054396 A1 | 2/2016 | Bell et al. |
| 2016/0054440 A1 | 2/2016 | Younis |
| 2016/0056635 A1 | 2/2016 | Bell |
| 2016/0056640 A1 | 2/2016 | Mao |
| 2016/0056669 A1 | 2/2016 | Bell |
| 2016/0056966 A1 | 2/2016 | Bell |
| 2016/0065005 A1 | 3/2016 | Won et al. |
| 2016/0079799 A1 | 3/2016 | Khlat |
| 2016/0087483 A1 | 3/2016 | Hietala et al. |
| 2016/0087486 A1 | 3/2016 | Pogorelik et al. |
| 2016/0094091 A1 | 3/2016 | Shin et al. |
| 2016/0094092 A1 | 3/2016 | Davlantes et al. |
| 2016/0099601 A1 | 4/2016 | Leabman et al. |
| 2016/0099602 A1 | 4/2016 | Leabman et al. |
| 2016/0099609 A1 | 4/2016 | Leabman et al. |
| 2016/0099610 A1 | 4/2016 | Leabman et al. |
| 2016/0099611 A1 | 4/2016 | Leabman et al. |
| 2016/0099612 A1 | 4/2016 | Leabman et al. |
| 2016/0099613 A1 | 4/2016 | Leabman et al. |
| 2016/0099614 A1 | 4/2016 | Leabman et al. |
| 2016/0099755 A1 | 4/2016 | Leabman et al. |
| 2016/0099756 A1 | 4/2016 | Leabman et al. |
| 2016/0099757 A1 | 4/2016 | Leabman et al. |
| 2016/0099758 A1 | 4/2016 | Leabman et al. |
| 2016/0100124 A1 | 4/2016 | Leabman et al. |
| 2016/0100312 A1 | 4/2016 | Bell et al. |
| 2016/0126752 A1 | 5/2016 | Vuori et al. |
| 2016/0126776 A1 | 5/2016 | Kim et al. |
| 2016/0141908 A1 | 5/2016 | Jakl et al. |
| 2016/0164563 A1 | 6/2016 | Khawand et al. |
| 2016/0181849 A1 | 6/2016 | Govindaraj |
| 2016/0181854 A1 | 6/2016 | Leabman |
| 2016/0181867 A1 | 6/2016 | Daniel et al. |
| 2016/0181873 A1 | 6/2016 | Mitcheson et al. |
| 2016/0191121 A1 | 6/2016 | Bell |
| 2016/0204622 A1 | 7/2016 | Leabman |
| 2016/0204642 A1 | 7/2016 | Oh |
| 2016/0238365 A1 | 8/2016 | Wixey et al. |
| 2016/0240908 A1 | 8/2016 | Strong |
| 2016/0294225 A1 | 10/2016 | Blum et al. |
| 2016/0299210 A1 | 10/2016 | Zeine |
| 2016/0323000 A1 | 11/2016 | Liu et al. |
| 2016/0336804 A1 | 11/2016 | Son et al. |
| 2016/0339258 A1 | 11/2016 | Perryman et al. |
| 2016/0359367 A1 | 12/2016 | Rothschild |
| 2016/0380464 A1 | 12/2016 | Chin et al. |
| 2017/0005481 A1 | 1/2017 | Von Novak, III |
| 2017/0005516 A9 | 1/2017 | Leabman et al. |
| 2017/0005524 A1 | 1/2017 | Akuzawa et al. |
| 2017/0005530 A1 | 1/2017 | Zeine et al. |
| 2017/0025903 A1 | 1/2017 | Song et al. |
| 2017/0026087 A1 | 1/2017 | Tanabe |
| 2017/0043675 A1 | 2/2017 | Jones et al. |
| 2017/0047784 A1 | 2/2017 | Jung et al. |
| 2017/0077733 A1 | 3/2017 | Jeong et al. |
| 2017/0077735 A1 | 3/2017 | Leabman |
| 2017/0077736 A1 | 3/2017 | Leabman |
| 2017/0077764 A1 | 3/2017 | Bell et al. |
| 2017/0077765 A1 | 3/2017 | Bell et al. |
| 2017/0077995 A1 | 3/2017 | Leabman |
| 2017/0085120 A1 | 3/2017 | Leabman et al. |
| 2017/0085437 A1 | 3/2017 | Condeixa et al. |
| 2017/0092115 A1 | 3/2017 | Sloo et al. |
| 2017/0110887 A1 | 4/2017 | Bell et al. |
| 2017/0110914 A1 | 4/2017 | Bell |
| 2017/0134686 A9 | 5/2017 | Leabman |
| 2017/0163076 A1 | 6/2017 | Park et al. |
| 2017/0168595 A1 | 6/2017 | Sakaguchi et al. |
| 2017/0179763 A9 | 6/2017 | Leabman |
| 2018/0040929 A1 | 2/2018 | Chappelle |

FOREIGN PATENT DOCUMENTS

| | | |
|---|---|---|
| DE | 2000216655 U1 | 2/2002 |
| EP | 1028482 A2 | 8/2000 |
| EP | 1081506 A1 | 3/2001 |
| EP | 2397973 A1 | 6/2010 |
| EP | 2346136 A1 | 7/2011 |
| EP | 2545635 | 9/2011 |
| GB | 2404497 A | 2/2005 |
| JP | 2006157586 A | 6/2006 |
| JP | 2007043432 A | 2/2007 |
| JP | 2008167017 A | 7/2008 |
| JP | 2015128349 A | 7/2015 |
| KR | 20060061776 A | 6/2006 |
| KR | 20070044302 A | 4/2007 |
| KR | 100755144 B1 | 9/2007 |
| KR | 20110132059 A | 12/2011 |
| KR | 20110135540 A1 | 12/2011 |
| KR | 20120009843 A | 2/2012 |
| KR | 20120108759 A | 10/2012 |
| KR | 1020130026977 A | 3/2013 |
| WO | 9952173 A2 | 10/1999 |
| WO | WO 200111716 A1 | 2/2001 |
| WO | 2004077550 A1 | 9/2004 |
| WO | 2003091943 A1 | 11/2006 |
| WO | WO 2006122783 | 11/2006 |
| WO | 2008156571 A2 | 12/2008 |
| WO | 2010022181 A1 | 2/2010 |
| WO | WO 2010039246 A1 | 4/2010 |
| WO | WO 2010138994 A1 | 12/2010 |
| WO | 2011112022 A2 | 9/2011 |
| WO | WO 2012177283 A1 | 12/2012 |
| WO | 2013035190 A1 | 3/2013 |
| WO | WO 2013031988 A1 | 3/2013 |
| WO | WO 2013038074 A2 | 3/2013 |
| WO | WO 2013042399 A1 | 3/2013 |
| WO | WO 2013052950 A1 | 4/2013 |
| WO | WO 2013105920 A2 | 7/2013 |
| WO | WO 2014075103 A1 | 5/2014 |
| WO | WO 2014132258 A1 | 9/2014 |
| WO | WO 2014182788 A2 | 11/2014 |
| WO | WO 2014182788 A3 | 11/2014 |
| WO | WO 2014197472 A1 | 12/2014 |
| WO | WO 2014209587 A1 | 12/2014 |
| WO | WO 2015038773 A1 | 3/2015 |
| WO | WO 2015097809 A1 | 7/2015 |
| WO | WO 2015161323 A1 | 10/2015 |
| WO | WO 2016024869 A1 | 2/2016 |
| WO | WO 2016048512 A1 | 3/2016 |
| WO | WO 2016187357 A1 | 11/2016 |

OTHER PUBLICATIONS

International Search Report dated Sep. 15, 2015 corresponding to International Patent Application No. PCT/US2014/037170, 4 pages.
International Search Report dated Oct. 16, 2014 corresponding to International Patent Application No. PCT/US2014/041546, 4 pages.
International Search Report dated Oct. 13, 2014 corresponding to International Patent Application No. PCT/US2014/041534, 4 pages.
International Search Report and Written Opinion of the International Searching Authority dated Nov. 12, 2014 corresponding to International Patent Application No. PCT/US2014/046956, 10 pages.

(56) References Cited

OTHER PUBLICATIONS

Energous Corp., Written Opinion, PCT/US2014/037170, dated Sep. 15, 2014, 7 pgs.
Energous Corp., IPRP, PCT/US2014/037170, Nov. 10, 2015, 8 pgs.
Energous Corp., Written Opinion, PCT/US2014/041534, dated Oct. 13, 2014, 6 pgs.
Energous Corp., IPRP, PCT/US2014/041534, Dec. 29, 2015, 7 pgs.
Energous Corp., IPRP, PCT/US2014/046956, Jan. 19, 2016, 7 pgs.
Energous Corp., Written Opinion, PCT/US2014/037072, dated Sep. 12, 2014, 5 pgs.
Energous Corp., IPRP, PCT/US2014/037072, Nov. 10, 2015, 6 pgs.
Energous Corp., ISRWO, PCT/US2014/068568, Mar. 20, 2015, 10 pgs.
Energous Corp., IPRP, PCT/US2014/068568, Jun. 14, 2016, 8 pgs.
Energous Corp., ISRWO, PCT/US2014/055195, Dec. 22, 2014, 11 pgs.
Energous Corp., IPRP, PCT/US2014/055195, Mar. 22, 2016, 9 pgs.
Energous Corp., ISRWO, PCT/US2015/067291, Mar. 4, 2016, 10 pgs.
Energous Corp., IPRP, PCT/US2015/067291, Jul. 4, 2017, 4 pgs.
Energous Corp., ISRWO, PCT/US2015/067242, Mar. 16, 2016, 9 pgs.
Energous Corp., IPRP, PCT/US2015/067242, Jun. 27, 2017, 7 pgs.
Energous Corp., ISRWO, PCT/US2015/067243, Mar. 10, 2016, 11 pgs.
Energous Corp., IPRP, PCT/US2015/067243, Jun. 27, 2017, 7 pgs.
Energous Corp., ISRWO, PCT/US2014/037109, Apr. 8, 2016, 12 pgs.
Energous Corp., IPRP, PCT/US2014/037109, Apr. 12, 2016, 9 pgs.
Energous Corp., ISRWO, PCT/US2015/067275, Mar. 3, 2016, 8 pgs.
Energous Corp., IPRP, PCT/US2015/067275, Jul. 4, 2017, 7 pgs.
Energous Corp., ISRWO, PCT/US2015/067245, Mar. 17, 2016, 8 pgs.
Energous Corp., IPRP, PCT/US2015/067245, Jun. 27, 2017, 7 pgs.
Energous Corp., ISRWO, PCT/US2014/041546, Oct. 16, 2014, 12 pgs.
Energous Corp., IPRP, PCT/US2014/041546, Dec. 29, 2015, 9 pgs.
Energous Corp., ISRWO, PCT/US2015/67250, Mar. 30, 2016, 11 pgs.
Energous Corp., IPRP, PCT/US2015/67250, Mar. 30, 2016, 10 pgs.
Energous Corp., ISRWO, PCT/US2015/067325, Mar. 10, 2016, 9 pgs.
Energous Corp., IPRP, PCT/US2015/067325, Jul. 4, 2017, 8 pgs.
Energous Corp., ISRWO, PCT/US2014/040697, Oct. 10, 2014, 12 pgs.
Energous Corp., IPRP, PCT/US2014/040697, Dec. 8, 2015, 9 pgs.
Energous Corp., ISRWO, PCT/US2014/040705, Sep. 23, 2014, 8 pgs.
Energous Corp., IPRP, PCT/US2014/040705, Dec. 8, 2015, 6 pgs.
Energous Corp., ISRWO, PCT/US2015/067249, Mar. 29, 2016, 8 pgs.
Energous Corp., IPRP, PCT/US2015/067249, Jun. 27, 2017, 7 pgs.
Energous Corp., ISRWO, PCT/US2015/067246, May 11, 2016, 18 pgs.
Energous Corp., IPRP, PCT/US2015/067246, Jun. 27, 2017, 9 pgs.
Energous Corp., ISRWO, PCT/US2014/059317, Feb. 24, 2015, 13 pgs.
Energous Corp., IPRP, PCT/US2014/059317, Apr. 12, 2016, 10 pgs.
Energous Corp., ISRWO, PCT/US2014/049669, Nov. 13, 2014, 10 pgs.
Energous Corp., IPRP, PCT/US2014/049669, Feb. 9, 2016, 8 pgs.
Energous Corp., ISRWO, PCT/US2014/041323, Oct. 1, 2014, 10 pgs.
Energous Corp., IPRP, PCT/US2014/041323, Dec. 22, 2015, 8 pgs.
Energous Corp., ISRWO, PCT/US2014/048002, Nov. 13, 2014, 11 pgs.
Energous Corp., IPRP, PCT/US2014/048002, Feb. 12, 2015 8 pgs.
Energous Corp., ISRWO, PCT/US2014/062682, Feb. 12, 2015, 10 pgs.
Energous Corp., IPRP, PCT/US2014/062682, May 3, 2016, 8 pgs.
Energous Corp., ISRWO, PCT/US2014/049666, Nov. 10, 2014, 7 pgs.
Energous Corp., IPRP, PCT/US2014/049666, Feb. 9, 2016, 5 pgs.
Energous Corp., ISRWO, PCT/US2014/046961, Nov. 24, 2014, 16 pgs.
Energous Corp., IPRP, PCT/US2014/046961, Jan. 19, 2016, 8 pgs.
Energous Corp., ISRWO, PCT/US2015/067279, Mar. 11, 2015, 13 pgs.
Energous Corp., IPRP, PCT/US2015/067279, Jul. 4, 2017, 7 pgs.
Energous Corp., ISRWO, PCT/US2014/041342, Jan. 27, 2015, 10 pgs.
Energous Corp., IPRP, PCT/US2014/041342, Dec. 15, 2015, 8 pgs.
Energous Corp., ISRWO, PCT/US2014/046941, Nov. 6, 2014, 11 pgs.
Energous Corp., IPRP, PCT/US2014/046941, Jan. 19, 2016, 9 pgs.
Energous Corp., ISRWO, PCT/US2014/062661, Jan. 27, 2015, 12 pgs.
Energous Corp., IPRP, PCT/US2014/062661, May 3, 2016, 10 pgs.
Energous Corp., ISRWO, PCT/US2014/059871, Jan. 23, 2015, 12 pgs.
Energous Corp., IPRP, PCT/US2014/059871, Apr. 12, 2016, 9 pgs.
Energous Corp., ISRWO, PCT/US2014/045102, Oct. 28, 2014, 14 pgs.
Energous Corp., IPRP, PCT/US2014/045102, Jan. 12, 2016, 11 pgs.
Energous Corp., ISRWO, PCT/US2014/059340, Jan. 15, 2015, 13 pgs.
Energous Corp., IPRP, PCT/US2014/059340, Apr. 12, 2016, 11 pgs.
Energous Corp., ISRWO, PCT/US2015/067282, Jul. 5, 2016, 7 pgs.
Energous Corp., IPRP, PCT/US2015/067282, Jul. 4, 2017, 6 pgs.
Energous Corp., ISRWO, PCT/US2014/041558, Oct. 10, 2014, 8 pgs.
Energous Corp., IPRP, PCT/US2014/041558, Dec. 29, 2015, 6 pgs.
Energous Corp., ISRWO, PCT/US2014/045119, Oct. 13, 2014, 11 pgs.
Energous Corp., IPRP, PCT/US2014/045119, Jan. 12, 2016, 9 pgs.
Energous Corp., ISRWO PCT/US2014/045237, Oct. 13, 2014, 16 pgs.
Energous Corp., IPRP, PCT/US2014/045237, Jan. 12, 2016, 12 pgs.
Energous Corp., ISRWO, PCT/US2014/054897, Feb. 17, 2015, 10 pgs.
Energous Corp., IPRP, PCT/US2014/054897, Mar. 15, 2016, 8 pgs.
Energous Corp., ISRWO, PCT/US2015/067334, Mar. 3, 2016, 6 pgs.
Energous Corp., IPRP, PCT/US2015/067334, Jul. 4, 2017, 5 pgs.
Energous Corp., ISRWO, PCT/US2014/047963, Nov. 7, 2014, 13 pgs.
Energous Corp., IPRP, PCT/US2014/047963, Jan. 26, 2016, 10 pgs.
Energous Corp., ISRWO, PCT/US2014/054891, Dec. 18, 2014, 12 pgs.
Energous Corp., IPRP, PCT/US2014/054891, Mar. 15, 2016, 10 pgs.
Energous Corp., ISRWO, PCT/US2014/054953, Dec. 4, 2014, 7 pgs.
Energous Corp., IPRP, PCT/US2014/054953, Mar. 22, 2016, 5 pgs.
Energous Corp., ISRWO, PCT/US2015/067294, Mar. 29 2016, 7 pgs.
Energous Corp., IPRP, PCT/US2015/067294, Jul. 4, 2017, 6 pgs.
Energous Corp., ISRWO, PCT/US2014/062672 Jan. 26, 2015, 11 pgs.
Energous Corp., IPRP, PCT/US2014/062672 May 10, 2016, 8 pgs.
Energous Corp., ISRWO, PCT/US2014/044810 Oct. 21, 2014, 12 pgs.
Energous Corp., IPRP, PCT/US2014/044810, Jan. 5, 2016, 10 pgs.
Energous Corp., ISRWO, PCT/US2015/067271, Mar. 11, 2016, 6 pgs.
Energous Corp., IPRP, PCT/US2015/067271, Jul. 4, 2017, 5 pgs.
Energous Corp., ISRWO, PCT/US2014/040648, Oct. 10, 2014, 11 pgs.
Energous Corp., IPRP, PCT/US2014/040648, Dec. 8, 2015, 8 pgs.

(56) References Cited

OTHER PUBLICATIONS

Energous Corp., ISRWO , PCT/US2014/049673, Nov. 18, 2014, 10 pgs.
Energous Corp., IPRP , PCT/US2014/049673, Feb. 9, 2016, 6 pgs.
Energous Corp., ISRWO , PCT/US2014/068282, Mar. 19, 2015, 13 pgs.
Energous Corp., IPRP, PCT/US2014/068282, Jun. 7, 2016, 10 pgs.
Energous Corp., ISRWO, PCT/US2014/068586, Mar. 20, 2015, 11 pgs.
Energous Corp., IPRP, PCT/US2014/068586, Jun. 14, 2016, 8 pgs.
Energous Corp., ISRWO, PCT/US2016/068504, Mar. 30, 2017, 8 pgs.
Energous Corp., ISRWO, PCT/US2016/068495, Mar. 30, 2017, 9 pgs.
Energous Corp., ISRWO, PCT/US2015/067287, Feb. 2, 2016, 8 pgs.
Energous Corp., IPRP, PCT/US2015/067287, Jul. 4, 2017, 6 pgs.
Energous Corp., ISRWO, PCT/US2016/068551, Mar. 17, 2017, 8 pgs.
Energous Corp., ISRWO, PCT/US2016/068498, May 17, 2017, 8 pgs.
Energous Corp., ISRWO, PCT/US2016/068993, Mar. 13, 2017, 12 pgs.
Energous Corp., ISRWO, PCT/US2016/068565, Mar. 8, 2017, 11 pgs.
Energous Corp., ISRWO, PCT/US2016/068987, May 8, 2017, 10 pgs.
Energous Corp., ISRWO, PCT/US2016/069316 , Mar. 16, 2017, 15 pgs.
Supplementary European Search Report, EP Patent Application No. EP14818136-5, dated Jul. 21, 2016, 9 pgs.
European Search Report, EP Patent Application No. EP16189052.0, dated Jan. 31, 2017, 11 pgs.
European Search Report, EP Patent Application No. EP16189319-3, dated Feb. 1, 2017, 9 pgs.
European Search Report, EP Patent Application No. EP14822971, dated Feb. 1, 2017, 9 pgs.
European Search Report, EP Patent Application No. EP16189987, dated Feb. 1, 2017, 8 pgs.
European Search Report, EP Patent Application No. 16196205.5, dated Mar. 28, 2017, 7 pgs.
European Search Report, EP Patent Application No. 16189300, dated Feb. 28, 2017, 4 pgs.
European Search Report, EP Patent Application No. 16189988.5, dated Mar. 10, 2017, 4 pgs.
European Search Report, EP Patent Application No. 16189982.8, dated Jan. 27, 2017, 9 pgs.
European Search Report, EP Patent Application No. 16189974, dated Mar. 2, 2017, 5 pgs.
European Search Report, EP Patent Application No. 16193743, dated Feb. 2, 2017, 5 pgs.
European Search Report, EP Patent Application No. 14868901.1, dated Jul. 7, 2017, 5 pgs.
L.H. Hsieh et al. Development of a Retrodirective Wireless Microwave Power Transmission System, IEEE, 2003 pp. 393-396.
B.D. Van Veen et al., Beamforming: A Versatile Approach to Spatial Filtering, IEEE, ASSP Magazine, Apr. 1988, pp. 4-24.
Leabman, Adaptive Band-partitioning for Interference Cancellation in Communication System, Thesis Massachusetts Institute of Technology, Feb. 1997, pp. 1-70.
Panda, SIW based Slot Array Antenna and Power Management Circuit for Wireless Energy Harvesting Applications, IEEE APSURSI, Jul. 2012, 2 pgs.
Singh, Wireless Power Transfer Using Metamaterial Bonded Microstrip Antenna for Smart Grid WSN: In Fourth International Conference on Advances in Computing and Communications (ICACC), Aug. 27-29, 2014, Abstract 299.
T. Gill et al. "A System for Change Detection and Human Recognition in Voxel Space using the Microsoft Kinect Sensor," 2011 IEEE Applied Imagery Pattern Recognition Workshop. 8 pgs.
J. Han et al. Enhanced Computer Vision with Microsoft Kinect Sensor: A Review, IEEE Transactions on Cybernetics vol. 43, No. 5. pp. 1318-1334, Oct. 3, 2013.
Zhai, "A Practical wireless charging system based on ultrawideband retro-reflective beamforming" 2010 IEEE Antennas and Propagation Society International Symposium, Toronto, ON 2010, pp. 1-4.
Mao: BeamStar: An Edge-Based Approach to Routing in Wireless Sensors Networks, IEEE Transactions on Mobile Computing, IEEE Service Center, Los Alamitos, CA US, vol. 6, No. 11, Nov. 1, 2007, 13 pgs.
Smolders—Institute of Electrical 1-15 and Electronics Engineers: "Broadband microstrip array antennas" Digest of the Antennas and Propagation Society International Symposium. Seattle, WA Jun. 19-24 1994. Abstract 3 pgs.
Paolo Nenzi et al; "U-Helix: On-chip short conical antenna", 2013 7th European Conference on Antennas and Propagation (EUCAP), Isbn:978-1-4673-2187-7, IEEE, Apr. 8, 2013, 5 pgs.
Adamiuk G et al; "Compact, Dual-Polarized UWB-Antanna, Embedded in a Dielectric" IEEE Transactions on Antenna and Propagation, IEEE Service Center, Piscataway, NJ, US vol. 56, No. 2, ISSN: 0018-926X, abstract; Figure 1, Feb. 1, 2010, 8 pgs.
Mascarenas et al.; "Experimental Studies of Using Wireless Energy Transmission for Powering Embedded Sensor Nodes." Nov. 28, 2009, Journal of Sound and Vibration, pp. 2421-2433.
Li et al. High-Efficiency Switching-Mode Charger System Design Conisderations with Dynamnic Power Path Management Mar./Apr. 2012 Issue, 8 pgs.
Energous Corp., ISRWO, PCT/US2016/069313, dated Nov. 13, 2017, 10 pgs.
Energous Corp., IPRP, PCT/US2016/069313, dated Jul. 3, 2018, 7 pgs.
Energous Corp., IPRP, PCT/US2016/068504, dated Jun. 26, 2018, 5 pgs.
Energous Corp., IPRP, PCT/US2016/068495, dated Jun. 26, 2018, 7 pgs.
Energous Corp., IPRP, PCT/US2016/068551, dated Jun. 26, 2018, 6 pgs.
Energous Corp., IPRP, PCT/US2016/068498, dated Jun. 26, 2018, 6 pgs.
Energous Corp., IPRP, PCT/US2016/068993, dated Jul. 3, 2018, 10 pgs.
Energous Corp., IPRP, PCT/US2016/068565, dated Jun. 26, 2018, 9 pgs.
Energous Corp., IPRO, PCT/US2016/068987, dated Jul. 3, 2018, 7 pgs.
Energous Corp., IPRP, PCT/US2016/069316, dated Jul. 3, 2018, 12 pgs.
Energous Corp., ISRWO, PCT/US2018/012806, dated Mar. 23, 2018, 9 pgs.
Energous Corp., ISRWO, PCT/US2017/046800, dated Sep. 11, 2017, 13 pgs.
Energous Corp., ISRWO, PCT/US2017/065886, dated Apr. 6, 2018, 13 pgs.
Order Granting Reexamination Request Control No. 90013793, dated Aug. 31, 2016, 23 pgs.
*Ossia Inc.* vs *Energous Corp.*, PGR2016-00023-Institution Decision, dated Nov. 29, 2016, 29 pgs.
*Ossia Inc.* vs *Energous Corp.*, PGR2016-00024-Institution Decision, dated Nov. 29. 2016, 50 pgs.
*Ossia Inc.* vs *Energous Corp.* PGR2016-00024-Judgement-Adverse, dated Jan. 20, 2017, 3 pgs.
ReExam Ordered Control No. 90013793, dated Feb. 2, 2017, 8 pgs.
*Ossia Inc.* vs *Energous Corp.*, Declaration of Stephen B. Heppe in Support of Petition for Post-Grant Review of U.S. Pat. No. 9,124,125, PGR2016-00024, dated May 31, 2016, 122 pgs.
*Ossia Inc.* vs *Energous Corp.*, Petition for Post-Grant Review of U.S. Pat. No. 9,124,125, dated May 31, 2016, 92 pgs.
*Ossia Inc.* vs *Energous Corp.*, Patent Owner Preliminary Response, dated Sep. 8, 2016, 95 pgs.
*Ossia Inc.* vs *Energous Corp.*, Petition for Post Grant Review of U.S. Pat. No. 9,124,125, dated May 31, 2016, 86 pgs.

(56) References Cited

OTHER PUBLICATIONS

*Ossia Inc.* vs *Energous Corp.*, Declaration of Stephen B. Heppe in Support of Petition for Post-Grant Review of U.S. Pat. No. 9,124,125, PGR2016-00023, dated May 31, 2016, 144 pgs.
European Search Report. EP15876036, dated May 3, 2018, 8 pgs.
Supplemental European Search Report. EP15874273.4, dated, May 11, 2018, 7 pgs.
Supplemental European Search Report. EP15876033.0, dated Jun. 13, 2018, 10 pgs.
Supplemental European Search Report. EP15876043.9, dated Aug. 8, 2018, 9 pgs.

* cited by examiner

SYSTEMS AND METHODS FOR REAL OR NEAR REAL TIME WIRELESS COMMUNICATIONS BETWEEN A WIRELESS POWER TRANSMITTER AND A WIRELESS POWER RECEIVER

CROSS-REFERENCE TO RELATED APPLICATIONS

This non-provisional application claims the benefit of U.S. Provisional Patent Application Ser. No. 62/272,878, entitled "Systems And Methods For Real Time Or Near Real Time Wireless Communications Between Electronic Devices," filed Dec. 30, 2015, which is incorporated by reference in its entirety.

This application is a continuation-in-part of U.S. patent application Ser. No. 14/856,219, entitled "Systems And Methods For Tracking Movement Of Receivers In A Transmission Field," filed Sep. 16, 2015, which is incorporated by reference in its entirety.

TECHNICAL FIELD

This application generally relates wireless communications between electronic devices, with exemplary applications in wireless power systems.

BACKGROUND

There are many use cases for lightweight, low-energy wireless communications protocols, such as Bluetooth®, where the devices need to communicate in real time or near-real time. But often the demands for high rate communications between devices exceeds the capabilities of such wireless communications protocols, as they can often operate too slowly for real-time or near-real time communications.

In wireless charging, it would be beneficial for transmitters and receivers to communicate using low-energy wireless protocols, but it would also be beneficial if the transmitters and receivers could communicate in real time or near-real time. So messages instructing the transmitter how to formulate power waves must be received from the receiver with minimal lag time. However, Bluetooth® was not designed for such rapid communications. Bluetooth® requires senders and receivers to "take turns" responding or not responding, which is prohibitive to achieving or simulating real time or near real time communications. For example, a Bluetooth® client would normally send a request for a data item from a peripheral device and then waits until some data item is received or the Bluetooth® client determines that no response is going to be received.

Furthermore, even if there is a way to increase the rate at which a device could transmit data through a communications protocol, there are often limitations on the hardware responsible for the communications protocol. For example, communications components, such as Bluetooth® chipsets or a Wi-Fi network interface card (NIC), often comprise memory buffers configured to store protocol-specific messages containing the data intended to be transferred between devices. These buffers may be configured to fill and empty according to a predetermined data flow between the devices, according to the particular protocol. In such examples, the buffers may not be capable of allowing for one device or another to continuously transmit data without interruption, outside the normal operational patterns of the protocols. As such, the hardware and firmware of the devices may be limited in their respective communications rates, such that real time or near-real time data transfers are impractical if not impossible with existing lightweight wireless communications protocols.

What is needed is a means for reducing the overhead requirements on devices communicating via a low-energy or other lightweight communications protocol, such as Bluetooth®. What is needed is a means for adjusting or otherwise modifying the data flow between communications components (e.g., Bluetooth® chipsets, Wi-Fi NICs) over conventional communication protocols that would allow data packets or messages to be transmitted from one device to another in real time or near-real time. What is needed is a mechanism through which the limitation of memory buffers filling up and thereby preventing further communication can be removed.

SUMMARY

Disclosed herein are systems and methods intended to address the shortcomings in the art and may provide additional or alternative advantages as well. Embodiments disclosed herein comprise devices, such as receivers and transmitters, having communications components that may communicate data samples, such as power values, in real time or near-real time, thereby allowing a first device (e.g., transmitter) to adjust in real time or near-real time operational behavior of the first device's hardware or software (e.g., adjust power waves) based upon the data samples (e.g., power values) received from a second device (e.g., receiver).

In an embodiment, a communications component of a first device comprises a processor configured to generate a first request for a data sample associated with a functional routine executed by a second device; and continuously and consecutively receive one or more data samples from the second device; and upon receiving from the second device at least one data signal comprising a flag bit: transmit a second request for a data sample associated with the functional routine executed by the second device.

In another embodiment, a communications component of a first device comprises: one or more memories configured to store one or more data messages containing data samples prior to transmission to a second device; and a processor configured to: continuously and consecutively generate the one or more data messages containing the one or more data samples; and upon determining that each of the one more memories are filled with one or more messages, transmit at least one data message containing an indicator that the one or more memories are full.

In another embodiment, a method comprises transmitting, by a communications component of a first device, to a second device a first request for one or more data samples associated with a functional routine of the second device; continuously and consecutively receiving, by the communications component of the first device, from the second device one or more data signals containing a data sample; and upon receiving from the receiver at least one data signal comprising a flag bit: transmitting, by the communications component of the first device, a second request for one or more data samples associated with the functional routine of the second device, the second request configured to cause the second device to reset one or more buffers of the communications component of the second device.

In yet another embodiment, a method comprises continuously and consecutively transmitting, by a communications component of a first device, to a second device one or more data samples generated from a functional routine executed by the first device; transmitting, by the communications component of the first device, to the second device at least one message comprising a flag bit upon determining that a set of one or more buffers of the communications component of the second device is unavailable; and resetting, by the communications component of the first device, the set of one or more buffers upon receiving a second request for the one or more data samples resulting from the functional routine.

In another embodiment, a method for wireless power transmission comprises continuously and consecutively receiving, by a communications component of a transmitter, one or more power messages from a receiver, each respective power message containing at least one power value associated with one or more power waves generated by the transmitter; upon receiving each consecutive power message, determining, by a processor of the transmitter, whether to adjust a characteristic of the one or more power waves based upon the at least one power value of the power message; and upon receiving at least one power message comprising a flag bit, transmitting, by the communications component of the transmitter, to the receiver a second request requesting the one or more power values.

In yet another embodiment, a transmitter device comprises a communications component configured to continuously and consecutively receive one or more power messages from a receiver, each respective power message containing at least one power value associated with or a measurement of one or more power waves generated by the transmitter, and the one or more power messages received via a communications signal independent of the one or more power waves; and a processor configured to: determine whether to adjust a characteristic of the one or more power waves based upon the at least one power value of each consecutive power message; and instruct the communications component to transmit to the receiver a request requesting the one or more power values associated with the one or more power waves, upon receiving at least one power message comprising a flag bit. The flag bit can be configured to instruct or otherwise trigger the transmitter to transmit a second request for one or more power values. In some embodiments, the flag bit received from the receiver can indicate that the receiver has no available output buffers or otherwise requests the transmitter to send the second request for the one or more power values.

In another embodiment, a method for wireless power transmission comprises receiving, by a communications component of a receiver, from a transmitter a first request for one or more power values associated with one or more power waves; continuously and consecutively transmitting, by the communications component of the receiver, one or more power messages containing a power value associated with the one or more power waves; and upon determining that a set of one or more buffers of the communications component of the receiver is unavailable: transmitting, by the communications component of the receiver, at least one message containing an indicator bit indicating that the set of one or more buffers are full or otherwise no another buffer is unavailable for transmission; and resetting, by the communications component of the receiver, at least one buffer memory in the set of one or more buffers of the communications component upon receiving a second request for one or more power values from the transmitter. In some embodiments, the communications component of the receiver may return from a transmission loop of continuously and consecutively transmitting power messages in order to allow or to otherwise cause the output buffers of the receiver to be reset.

In yet another embodiment, a wireless charging receiver device comprises a communications component comprising: a set of one or more buffer memories configured to store one or more power messages containing one or more power values; and a processor configured to continuously and consecutively transmit to a transmitter the one or more power messages until determining that the set of one or more buffer memories are filled, and upon determining that the set of one or more buffer memories are filled, transmit an indicator bit or flag to the transmitter and reset the set of one or more buffer memories in the receiver; and a processor configured to continuously and consecutively determine a power value associated with one or more power waves for each consecutive power message generated by the communication component of the receiver device.

It is to be understood that both the foregoing general description and the following detailed description are exemplary and explanatory and are intended to provide further explanation of the invention as claimed. Although some of the features and benefits of the current invention has been described in the context of wireless charging, it should be understood that the invention can be used in the context of any communication link, wired or wireless, where efficient and low power transmission of data is needed.

BRIEF DESCRIPTION OF THE DRAWINGS

The accompanying drawings constitute a part of this specification and illustrate several possible embodiments. The present disclosure can be better understood by referring to the following figures. The components in the figures are not necessarily to scale, emphasis instead being placed upon illustrating the principles of the disclosure.

DETAILED DESCRIPTION

Figure 1:
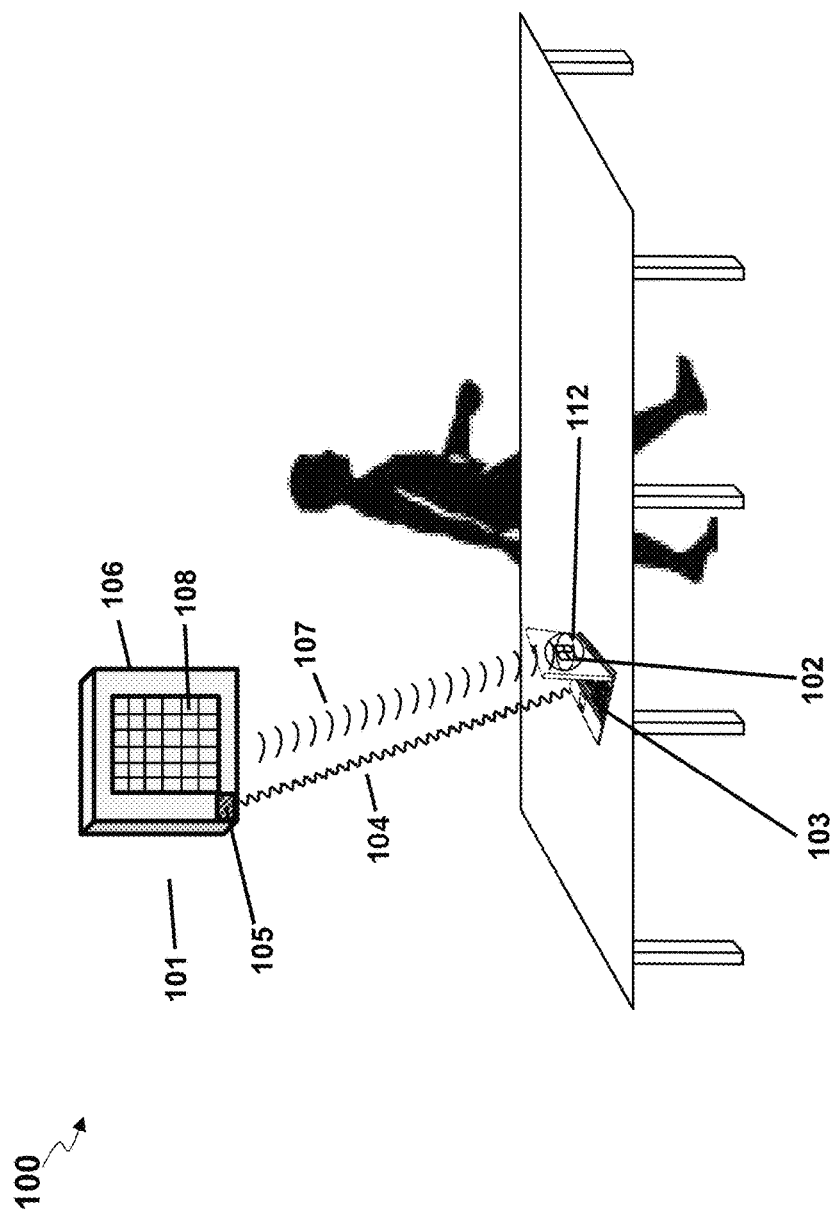
FIG. 1 shows components of a wireless power transmission system, according to an exemplary embodiment.

Reference will now be made to exemplary embodiments illustrated in the drawings, and specific language will be used to describe the same. It will nevertheless be understood that no limitation on the scope of potential embodiments is intended. Other embodiments may be used and/or other changes may be made without departing from the spirit or scope of the present disclosure. The illustrative embodiments described in the Detailed Description are not meant to be limiting upon the subject matter presented herein.

Exemplary System and Method of Wireless Charging System

FIG. 1 shows components of a wireless power transmission system 100, according to an exemplary embodiment. The exemplary system 100 may comprise a transmitter 101 and a receiver 102 coupled to an electronic device 103. The transmitter 101 and receiver 102 may exchange information related to power waves, including information regarding the location of the receiver 102 within a transmission field and the amount of power being received by the receiver 102, and other forms of administrative information, through a communication signal 104. Based on the information gathered over communications signal 104, the transmitter 101 may generate and transmit one or more power waves 107 to the receiver 102, or some location proximate to the receiver 102, allowing the receiver 102 to gather energy from the power waves 107 and convert the energy into electrical current to power the electronic device 103.

A transmitter 101 may comprise an antenna array 106 having one or more antennas that may transmit power waves 107 into a transmission field, which may be a two or three-dimensional space where the transmitter 101 may provide power waves 107 to one or more receivers 102. In some instances, the transmitter 101 may generate and transmit power waves 107 having waveform characteristics (e.g., frequency, amplitude, trajectory, phase) that cause the power waves 107 to converge at a predetermined location in the transmission field to form constructive or destructive interference patterns. When enough power waves 107 accumulate constructively at a particular location, the resulting constructive interference pattern may form a pocket of energy 112. And when enough power waves accumulate destructively at a particular location, the resulting destructive interference pattern may form a null space in the transmission field. The targeted receiver 102 may comprise various circuitry configured to capture energy from a pocket of energy 112 and then convert the energy into usable power for the electronic device 103.

The transmitter 101 may comprise a communications component 105 that may effectuate wired and/or wireless communications to and from one or more receivers 102 of the system 100. In some embodiments, a communications component 105 may be an embedded component of the transmitter 101; and, in some embodiments, the communications component 105 may be attached to the transmitter 101 through any wired or wireless communications medium. In some instances, an attached communications component 105 may be shared among a plurality of transmitters 101, such that each of the transmitters 101 coupled to the communications component 105 may use the data received within a communications signal 104, by the communications component 105. The transmitter communications component 105 may comprise electromechanical components (e.g., processor, antenna) that allow the communications component 105 to communicate various types of data with corresponding receiver communications components (not shown) of one or more receivers 102. The transmitter communications component 105 may be configured to exchange communications signals 104 with the receiver communications component based on one or more wired or wireless communications protocols. Non-limiting examples of such protocols may include: Bluetooth®, Wireless Fidelity (Wi-Fi), Near-Field Communications (NFC), ZigBee, and others. It should be appreciated that the communications component 105 is not limited to radio-frequency based technologies, but may include radar, infrared, and sonic devices (e.g., ultrasound) for sonic triangulation, and may be used for determining the location, or other aspects, of a receiver 102.

The data contained within the communications signals 104 may be used by the transmitter 101 and/or the receiver 102 to determine how the transmitter 101 should generate and transmit, safe and effective power waves 107, from which the receiver 102 may capture energy and convert it to usable alternating current (AC) or direct current (DC) electricity, or other forms of energy. Using the communications signal 104, the transmitter 101 and receiver 102 may exchange data that may be used for various functions of the transmitter 101, such as: identifying receivers 102 within the transmission field; determining whether electronic devices 103 or users are authorized to receive power waves 107; determining safe and effective waveform characteristics for power waves 107; and honing or optimization of the placement of pockets of energy 112 in the transmission field with respect to the receivers 102, among other possible functions.

Similarly, a receiver communications component, which may be integrated into a receiver 102 or electrical device 103 as shown in FIG. 1, may use a communications signal 104 to communicate operational data with the communications component 105 of the transmitter 101, where such operational data may be used for various functions of the transmitter 101 or receiver 102, such as: alerting a transmitter 101 that the receiver 102 has entered, or is about to enter, into the transmission field of the transmitter 101; providing information about the user or the electronic device 103 being charged by the receiver 103, such as authentication data or a system profile; indicating the effectiveness of the power waves 107 or pocket of energy 112 in providing power to the receiver 102, such as a power level conversion or reception indicator; and providing updated transmission parameters for the transmitter 101 to use to adjust the power waves 107 to form more effective pockets of energy 112 or null spaces (not shown), among other types of useful data. Moreover, the communications component 105 of the transmitter 101 and the receiver communication component may communicate different types of data (e.g., authentication data, heat-mapping data, transmission parameters) containing various types of information, message, and data points; non-limiting examples of possible information, messages, and data points may include: a transmitter identifier (transmitter ID), a receiver identifier (receiver ID), a Bluetooth® unique identifier (Bluetooth ID), a beacon message, a device identifier (device ID) for an electronic device 103, a user identifier (user ID), the battery level for the electronic device 103, the receiver's 102 location in the transmission field, and the electronic device's 103 location in the transmission field, among a number of other possible types of information, messages, and/or data points.

The antenna array 106 may be a set of one or more antennas 108 configured to transmit power waves 107 into the transmission field of the transmitter 101. Integrated circuits (not shown) of the transmitter 101, such as a controller circuit and/or waveform generator, may control the behavior of the antennas 108. For example, based on the information received from the receiver 102 via the communications signal 104, a controller circuit may determine a set of waveform characteristics (e.g., amplitude, frequency, trajectory, phase) for generating power waves 107 that would effectively provide power to the receiver 102 and electronic device 103. The controller circuit may also identify a subset of antennas 108 from the antenna array 106 that would be effective in transmitting the power waves 107. As another example, a waveform generator circuit of the transmitter 101 coupled to the controller may convert energy and generate the power waves 107 having the waveform characteristics identified by the controller, and then provide the power waves 107 to the antenna array 106 for transmission.

In some implementations, an antenna 108 of the antenna array 106 may transmit power waves 107 having a set of characteristics that cause the power waves 107 to arrive at a given location within a transmission field and constructively or destructively accumulate as needed. For instance, when forming a pocket of energy 112, the antennas 108 of the antenna array 106 may transmit power waves 107 that intersect at a given location (usually at or nearby a detected receiver 102), and due to the respective characteristics of each of the power waves 107 generated by each respective antenna 108, the intersecting power waves 107 form a constructive interference pattern having enough energy to create a useful pocket of energy 112 from which the receiver 102 may collect energy and generate electric power. It should be appreciated that, although the exemplary system 100 describes radio-frequency based power waves 107, additional or alternative transmitter antennas, antenna arrays, and/or wave-based technologies may be used (e.g., ultrasonic, infrared, magnetic resonance) to wirelessly transmit power from the transmitter 101 to the receiver 102.

Receivers 102 may be used for powering or charging an associated electronic device 102 coupled to or integrated with one or more receivers 102. A receiver 102 may comprise one or more antennas (not shown) that may receive power waves 107 originating from one or more transmitters 101. In some implementations, the receiver 102 may receive power waves 107 transmitted directly from a transmitter 101; and, in some implementations, the receiver 102 may capture energy from the constructive interference pattern defining a pocket of energy 112 and formed from power waves 107. The pocket of energy 112 may be a three-dimensional field of energy resulting from the convergence of power waves 107 at a location in the transmission field.

The receiver 102 may comprise circuitry (not shown) configured to capture energy from a pocket of energy 112 or power waves 107, and then convert that energy into electricity usable by the electronic device 103. Non-limiting examples of such circuits may include a controller-processor integrated circuit, an amplifier, a rectifier, and a voltage conditioner, among others. After the power waves 107 are received and/or energy is gathered from a pocket of energy 112, the receiver's 102 circuitry (e.g., integrated circuits, amplifiers, rectifiers, voltage conditioner) may convert the energy of the power waves 107 (e.g., radio frequency electromagnetic radiation) to electric power (i.e., electricity), which may be stored into a battery (not shown) or used by an electronic device 103.

As previously mentioned, a receiver 102 or an electronic device 103 may comprise a receiver-side communications component (not shown) configured to communicate various types of data with the transmitter 101 in real-time or near real-time, through a communications signal 104 generated by the receiver-side communications component. The data may include location indicators for the receiver 102 and/or electronic device 103, and a power status of the device 103, status information for the receiver 102, status information for the electronic device 103, status information for the power waves 107, and/or status information for the pockets of energy 112. In other words, the receiver 102 may provide real time or near-real time data to the transmitter 101, via the communications signal 104, regarding the current operation of the system 100, including: the present location the receiver 102 or the device 103, the amount of energy received by the receiver 102, and the amount of power received and/or used by the electronic device 103, among other possible data points containing other types of information.

As mentioned, in some implementations, the receiver 102 may be integrated into the electronic device 103, such that, for all practical purposes, the receiver 102 and electronic device 103 may be understood to be a single unit or product; but, in some embodiments, the receiver 102 may be permanently or detachably coupled to the electronic device 103 at some point after production of the receiver 102 and electronic device 103. It should be appreciated that the receiver 102 may be configured to use the communications component of the electronic device 103, and/or the receiver 102 may comprise a communications component that is independent of the electronic device 103.

An electronic device 103 coupled to a receiver 102 may be any electronic device 103 that requires continuous power, or that draws stored power from a battery (not shown). The receiver 102 may be permanently integrated into the electronic device 103, or the receiver 102 may be permanently or detachably coupled to the electronic device 103. Non-limiting examples of electronic devices 103 may include laptops, mobile phones, smartphones, tablets, music players, toys, batteries, flashlights, lamps, electronic watches, cameras, gaming consoles, appliances, GPS devices, and wearable devices or so-called "wearables" (e.g., fitness bracelets, pedometers, smart watch), among other types of electrical devices 121.

Figure 2:
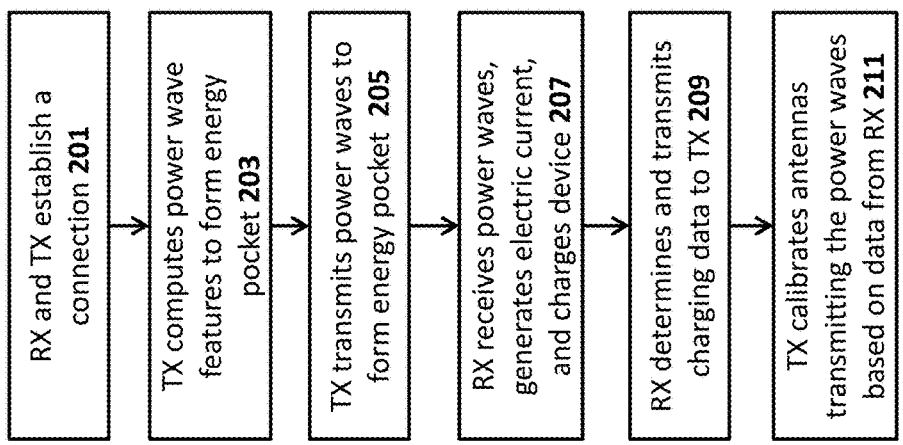
FIG. 2 shows steps of wireless power transmission, according to an exemplary method embodiment.

FIG. 2 shows steps of wireless power transmission, according to an exemplary method 200 embodiment. The exemplary method 200 comprises steps 201, 203, 205, 207, 209, and 211. However, it should be appreciated that other embodiments may include additional or alternative steps, or may omit one or more steps of the exemplary method 200 shown in FIG. 2, but may nevertheless fall within the scope of this disclosure.

In a first step 201, a transmitter (TX) and receiver (RX) establish a connection or otherwise associates with one another according to a particular wireless communication protocol. Transmitters and receivers may communicate operational data containing various operational data values and/or operational instructions using a communications signal, according to a wireless communication protocol capable of transmitting data between communications components of electrical devices (e.g., Bluetooth®, Bluetooth Low Energy (BLE), Wi-Fi, NFC, ZigBee®). Some protocols require devices to associate with one another in order to conduct various protocol-specific handshakes, authentication protocols, and other potential administrative data exchanges. For example, to communicate using a Wi-Fi based communications signal, the transmitter may function as a wireless access point requiring the receiver to be authenticated, both the transmitter and receiver may need to be authenticated to a standalone wireless access point.

As another example, in embodiments implementing Bluetooth®, or Bluetooth® variants, a Bluetooth-enabled communications component of a transmitter may scan for receivers indirectly broadcasting advertisement signals, or the transmitter may receive an advertisement signal from the transmitter. The advertisement signal may announce the receiver's presence to the transmitter, and may trigger an association between the transmitter and the receiver. As described herein, in some embodiments, the advertisement signal may communicate information that may be used by various devices (e.g., transmitters, client devices, sever computers, other receivers) to execute and manage pocket-forming procedures. Information contained within the advertisement signal may include a device identifier (e.g., MAC address, IP address, UUID), the voltage of electrical energy received, client device power consumption, and other types of data related to power transmission. The transmitter may use the advertisement signal to identify the receiver and, in some cases, locate the receiver in a two or three-dimensional space. Once the transmitter identifies the receiver, the transmitter may establish the Bluetooth connection thereby associating the transmitter with the receiver and allowing the transmitter and receiver to communicate operational data via communications signals.

In a next step 203, the transmitter may use the advertisement signal to determine a set of characteristics for power waves that would effectively establish a pocket of energy at or near the receiver. Non-limiting examples of features of power waves may include phase, gain, amplitude, power level, frequency, and trajectory, among others. The transmitter may use information contained in the receiver's advertisement signal and subsequent communications signals in order to gather the data needed to determine the effective waveform characteristics for producing and transmitting power waves.

In a next step 205, after the transmitter determines the appropriate waveform characteristics for the power waves, the transmitter may begin generating and transmitting power waves. As the power waves are transmitted, their respective characteristics may cause them to converge at a predetermined location in a transmission field, resulting in a constructive interference pattern that forms a pocket of energy at or near the location of the receiver. An antenna of the receiver may capture or otherwise receive energy from the energy field resulting from the constructive interference pattern that defines the pocket of energy.

In a next step 207, the receiver may capture or otherwise receive the electrical energy directly from the power waves or from a pocket of energy defined by a constructive interference pattern resulting from the constructive accumulation of converging power waves. As previously mentioned, the receiver may comprise circuitry configured to convert the energy captured from the constructive interference patterns into electrical current that may power an electrical device coupled to receiver, such as a laptop computer, smartphone, battery, toy, or other electronic device. In some embodiments, an AC/DC converter may convert the electrical energy from AC-current into DC-current, or from DC-current into AC-current. In embodiments where the circuitry of the receiver generates AC-current from the power waves, the receiver may comprise a rectifier circuit that may rectify the AC-current in order to provide usable DC-current to the electronic device coupled to the receiver.

In a next step 209, the receiver may generate operational data containing information indicating the effectiveness of the power waves or pocket of energy. This operational data may then be communicated to the transmitter through the communications signal, using a particular wireless protocol (e.g., Bluetooth®, Wi-Fi, ZigBee, NFC, RFID). When generating the operational data, the receiver may identify and/or process data points and other information useful for instructing the transmitter on generating and transmitting, or otherwise adjusting, the power waves. Non-limiting examples of data points and other types of information that may be included in the operational data or may be used to generate the operational data, may include: the quality of the power waves, the quality of the battery charge or quality of the power reception, the location or motion of the receiver, the power levels (e.g., amount of voltage) received and converted by the receiver, and/or the amount of power used by the electronic device. As an example, the receiver may determine how much energy the antenna of the receiver is receiving from the power waves or pocket energy, how much energy the receiver is converting into electric power, the amount of electric power the receiver is providing to the electronic device, and/or the power consumption or requirements of the electronic device, among others.

In operation, as the transmitter continuously transmits the power waves, the receiver may be continuously generating and transmitting operational data containing information related to the effectiveness of the power waves, and providing this data via the communications signal to the transmitter in real time or near-real time. The operational data may inform the transmitter how to generate and transmit, or otherwise adjust, the power waves to provide effective or improved wireless-charging service to the receiver. The communications signals may be transmitted and received independent from the power waves, using a wireless protocol capable of communicating operational data between the transmitter and receiver, including BLE, NFC, Wi-Fi, and the like.

In a next step 211, the transmitter may calibrate or otherwise adjust the characteristics of the power waves and/or the antennas transmitting the power waves, so that the antennas transmit power waves having a more effective set of waveform characteristics (e.g., trajectory, frequency, phase, gain, amplitude). In some embodiments, a processor of the transmitter may automatically determine more effective features for generating and transmitting the power waves based on the operational data received from the receiver via the communications signal.

Figure 3:
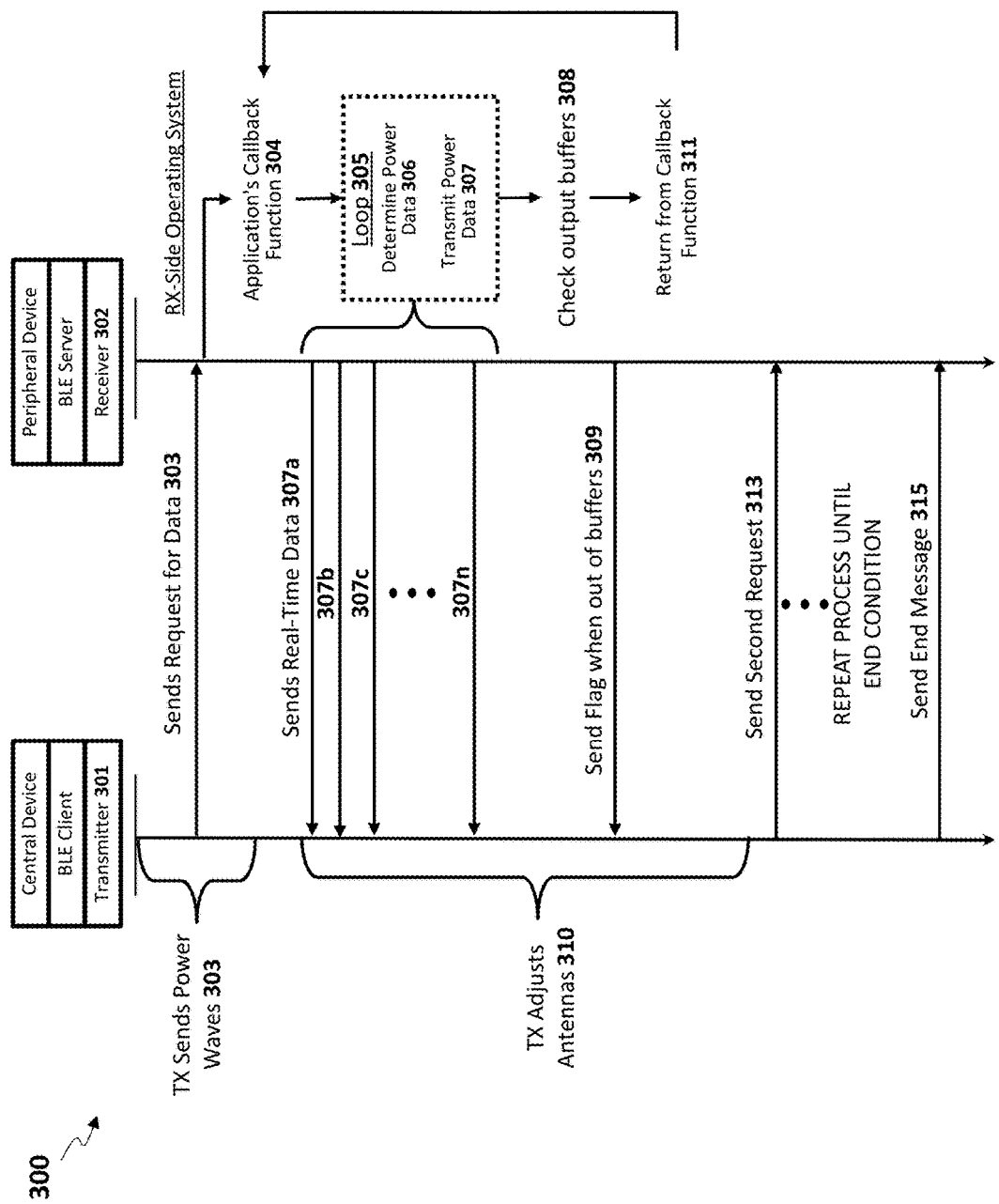
FIG. 3 shows the logical data flow for communications over a Bluetooth® communications signal, between a transmitter and a receiver, during a wireless power transmission process, according to an exemplary embodiment.

FIG. 3 shows the logical data flow for communications over a Bluetooth® communications signal, between a transmitter 301 and a receiver 302, during a wireless power transmission process 300, according to an exemplary embodiment. In the exemplary embodiment, the transmitter 301 and receiver 302 may comprise improved communications components, which may expand upon the features and capabilities of conventional hardware and software components used to send and receive a communications signal, such as a Bluetooth® processor and antenna. The improved communications components may be configured to send and receive real time or near-real time operational data that may be used by the transmitter 301 for power wave generation and transmission, thereby allowing the transmitter 301 to adjust the antennas and power waves in real time or near-real time. The improved communications components may be configured to communicate the operational data through communications signals using known communications protocols, such as Bluetooth®. However, the communication components may be configured to communicate the operational data through conventional protocols in a way that conventional communications components were previously incapable, and which were regularly discouraged by the art, to accomplish results that were previously believed to be impossible. The improved communications components permit the receiver 302 to transmit the operational data via the communications signals in real time or near-real time to the transmitter 301, thereby allowing the transmitter 301 to adjust the power waves in real time or near-real time accordingly.

As previously mentioned, the transmitter 301 and receiver 302 may communicate operational data that informs the transmitter 301 how to generate safe and effective power waves. The transmitter 301 may periodically or continuously adjust the antennas to produce power waves differently, based upon the operational data received back from the transmitter 302. It is desirable for the transmitter 301 to be able to minimize the amount of energy that is transmitted in the proximity of a person through further adjustments, to minimize the time needed to adjust the power waves when a person is in power wave transmission path, and to adjust the power waves to maintain the most effective and/or efficient power waves possible. These goals can be better addressed when the transmitter 301 and receiver 302 are communicating real time or near-real time operational data, to allow for real time or near-real time transmit antenna adjustments. To facilitate real time or near-real time transmit antenna adjustments, the transmitter 301 needs to receive operational power data from the receiver 302 in real time or near-real time. Conventional communications components are ordinarily limited with regards to allowing the receiver to 302 to determine and report operational data to the transmitter 301 fast enough for the transmitter 301 to adjust the antennas in real time or near-real time. The exemplary embodiment shown in FIG. 3 addresses such limitations by allowing the communications component of the receiver 302 to transmit real time or near-real time operational power data to the transmitter 301.

It should be appreciated that the exemplary embodiment described in FIG. 3 is not limited to practice in wireless power transmission processes. One having skill in the art would appreciate that any number of alternative embodiments may exist where a first device (e.g., transmitter 301) and a second device (e.g., receiver 302) communicate wirelessly, and where the first device polls or otherwise requests the second device to report data in real time or near-real time so that the first device may likewise adjust operations in real time or near-real time.

In a first step 303, a transmitter 301 may transmit power waves to a receiver 302 and may also transmit a request for the receiver 302 to report back power data or other operational data. The devices 301, 302 may comprise communications components configured to communicate the power data via a communications signal using a wireless communications protocol, such as Bluetooth®. In some cases, before transmitting the power waves, the transmitter 301 may be associated with the receiver 302 according to the operational rules of the communications protocol. Before, during, or after transmitting the power waves, the transmitter 301 may transmit a request for the receiver 302 to report the power data or other operational data. In some implementations, this request may instruct, or may otherwise trigger, the receiver 302 to execute an operating system function, software application, or other software or firmware routine that generates and reports back power data indicating the effectiveness of the power waves.

In a next step 304, when the receiver 302 receives from the transmitter 301 the power waves and/or the Bluetooth® message requesting the power data, the receiver 302 may execute a software "callback" function for continuously determining the power data and transmitting the power data to the transmitter 301.

In a next step 305, upon executing or triggering the callback function, the receiver 302 enters into a recurring loop during which, among other possible actions, the callback function of the receiver 302 may determine in a next step 306 the power data based on the power waves received from the transmitter 301, and then in a following step 307 may transmit the power data to the transmitter 301. This power data may be determined by hardware devices that measure the voltage and current from the receiver antenna array, and report the voltage and current, or their resultant power product to the receiver's processor. In addition, before returning to the beginning of the loop, the communications component of the receiver 302 determines, in a subsequent step 308, whether there are any available output buffers for transmitting additional outbound messages to the transmitter 301.

In a next step 306, the callback function of the receiver 302 may determine one or more types of power level data based on efficacy of the power waves captured or otherwise received by the receiver 302. Non-limiting examples of power data may include the amount of RF energy received or otherwise captured by the antennas of the receiver 302, the amount of RF energy the receiver is converting or has converted to AC or DC, and how much power is required by an electronic device or battery coupled to the receiver 302, charge level of the battery of the device, among other types of power data. Further explanation and examples of how such power level data may be determined and transmitted to the transmitter 301 can be found in U.S. patent application Ser. No. 14/856,219, entitled "Systems And Methods For Tracking Movement Of Receivers In A Transmission Field," filed Sep. 16, 2015, which is incorporated by reference in its entirety. The callback function of the receiver 302 may determine power data for a given moment or continuously for a certain time period. As the receiver 302 determines the power data at a given instant, the receiver 302 may then populate one or more output buffers of the communications component with the power data determined for the given instant. The output buffers may be a volatile memory component of the communications component of the receiver 302 that may store wireless messages prepared by the receiver 302. In some implementations, the output buffers may function as a first-in-first-out (FIFO) memory that temporarily stores wireless messages to be transmitted to the communications component of the transmitter 301, such that the output buffers operate as a queue for wireless messages containing the power data as the power data is generated.

In a next step 307, after determining the power level for a given instant or time period, the receiver 302 may transmit to the transmitter 301 the power data recently stored into the output buffers. In some cases, the wireless messages containing the power data may be transmitted as the power data is generated, which provides for faster response times for the transmitter 301 to adjust the antennas. In some cases, the wireless messages may be placed into an output buffer and may be transmitted when the output buffer is filled. This may slow the process 300 slightly, but may be useful for providing more information to the transmitter 301. As seen shown in FIG. 3, the communications component of the receiver 302 may transmit a power data to the transmitter 301 each interval through the loop 305, and thus the receiver may continuously determine power value data and then transmit to the transmitter 301 consecutive power messages 307a-n containing each consecutive power value determination.

In a next step 308, after each respective power message is transmitted 307a-n to the transmitter via the communications signal, a processor of the communications component of the receiver or the processor of the receiver may determine whether the output buffers of the communications component are filled or used. A communications component of the receiver may comprise a predetermined number of output buffers and/or a predetermined output buffer size, where an output buffer may be a volatile memory location that temporarily stores messages to be outputted and/or messages that were recently outputted. The communications component may determine the number of available output buffers and/or the number of buffers currently occupied, which is ordinarily zero or otherwise very few at the beginning of the process 300. As each successive power message is generated and transmitted, the output buffers are filled, which could eventually prohibit generation and transmission of additional power messages to the transmitter because ultimately no output buffer would be available.

When output buffers are not filled or are otherwise available, the loop 305 continues, back to previous step 306, to determine one or more power values.

During execution of the loop 305, the transmitter 301 may perform a set of steps 310, in which the transmitter adjusts the antennas transmitting the power waves based upon the power value data received in the successive power messages. In some implementations, the transmitter 301 may determine whether to adjust the power waves to more accurately converge and form constructive interference at or near the receiver 302, when the power levels reported back from the receiver 302 fail to satisfy a power level threshold. The power level threshold may be predetermined and stored in memory of the transmitter 301 or may be received as a power value from the receiver, acting on behalf of an electronic device coupled to the receiver 302. The power waves may converge at the location due to the waveform characteristics used to generate and transmit the power waves, and in some cases, due to which antennas are used to transmit the one or more power waves. In order to adjust and better transmit the power waves, the transmitter 301 may use the power values received from the receiver 302 to identify whether the adjustments are needed, and then to determine which characteristics should be adjusted. For example, the receiver may report that too much power is being received, and thus the receiver may determine that a lower amplitude, or fewer power waves are needed.

It should be noted that such adjustments of the antennas in real time or near-real time would not be feasible using conventional communications components, such as Bluetooth® chips and related firmware, because such conventional devices are unable to continuously and consecutively transmit data messages to the receiver as the data messages are being produced. In addition, the conventional communications components would not be capable of overcoming the limitations of the output buffers. Although it is contrary to conventional wisdom, communications components may be configured to execute loop 305, which may bypass conventional handshakes and/or other overhead processes associated with the particular wireless protocol and/or incorporate a mechanism to reset the buffers when they are determined to be filled, thereby permitting the receiver 302 to generate and transmit to the transmitter 301 power messages containing power data at nearly the same instant the power data is produced.

In a next step 309, after determining that the output buffers are filled, the communications component of the receiver may transmit a power message containing an indicator or flag bit to the transmitter 301. The power message containing the flag bit may or may not contain power value data or other operational data, or may only contain the flag bit. The flag bit may indicate that the buffers of the receiver are filled, or may otherwise instruct the transmitter to transmit a new request for power values. One having skill in the art would appreciate that rather than just one flag bit, one or more bits may be used to indicate that buffers are filled or unavailable, or to otherwise trigger the transmitter 301 to transmit a new request for power values. One or more flag or indicator bits may also be transmitted between the transmitter 301 and receiver 302 to trigger other behaviors, such as requesting that the transmitter 301 stop transmitter power waves, or instructing the receiver 302 to reset the output buffers of the receiver communications component. It should be appreciated that the terms "flag bit," "flag bits," "indicator bit," and "indicator bits" are used interchangeably herein, and may comprise one or more binary data bits configured to instruct or otherwise trigger hardware and/or software behavior by the device intended to receive the one or more binary data bits.

In a next step 311, the communications component of the receive 302 may reset the memory address of the memory buffers or may purge the data stored in the memory buffers, or otherwise make the buffers again available to output messages from receiver to transmitter, and may then return to a ready state for the call back function, as in previous step 304.

In a next step 313, when the transmitter 301 receives the indicator or flag bit from receiver 302, the transmitter may automatically transmit a new request for power data and/or other operational data. The process 300 may then repeat until the receiver no long requires power waves from the transmitter 301 or there is some other break in the wireless association of the devices.

The process 300 may continue to repeat until an ending condition is detected or is otherwise identified by the transmitter 301. One skilled in the art may recognize that there may be any number of ending conditions that may be recognized by either the transmitter or the receiver. However, for ease of description in the exemplary embodiment, the transmitter 301 may be configured to stop the power transmission process 300 for the receiver 302 when the transmitter 301 receives a signal from the receiver 302 indicating that the receiver 302 no longer needs power or when the receiver 302 is physically moved beyond the range of the power waves or the communications signals of transmitter 301.

As another example, a receiver 302 may send a message, indicator or flag bit, or some other signal to the transmitter 301 requesting the end of power transmission. In this example, the receiver 302 may automatically determine that no further power is required, or a user may operate a software application that instructs the receiver 302 to transmit an end-request. As another example, the transmitter 301 may decide to end power transmission when the receiver 301 or user has exceeded an authorized amount of energy, or an application monitoring operations of a wireless power transmission system comprising the transmitter 301 may instruct the transmitter 301 to end the power transmission process 300.

In a next step 315, after the transmitter 301 determines to stop transmitter power waves due to an end condition, the transmitter 301 may then send through the communications signal a special message with a flag bit or other indicator bit that signals to receiver 302 to stop sending power data messages to transmitter 301. In some implementations, the receiver 302 may cease operations, and in some implementations, the receiver 302 application or software module may return from the callback function to ready state, as in previous step 311.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," and the like, are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

What is claimed is:

1. A method for wireless power transmission comprising:
   receiving, by an antenna of a receiver, a plurality of radio frequency (RF) power waves from a transmitter that constructively interfere at a location of the receiver;
   receiving, by a communications component of the receiver and using a pre-existing wireless protocol that includes handshakes, from the transmitter a first request for one or more power values associated with reception of the plurality of RF power waves at the receiver;
   in response to the first request and without requiring an additional request for power values from the transmitter, continuously and consecutively executing respective iterations of a loop executed at the receiver, each respective iteration of the loop bypassing the handshakes and other overhead processes associated with the pre-existing wireless protocol, and each respective iteration of the loop including:
      measuring one or more power values associated with reception of the plurality of RF power waves received at the receiver during the respective iteration of the loop;
      transmitting a respective power message to the transmitter, wherein the respective power message contains at least the measured one or more power values; and
      proceeding to a next respective iteration of the loop in accordance with a determination that one or more buffers of the communications component that are configured to store the plurality of power messages are not full;
   receiving, by the antenna of the receiver, a plurality of adjusted RF power waves from the transmitter, wherein the plurality of adjusted RF power waves are adjusted by the transmitter in accordance with the one or more power values in the plurality of power messages;
   in accordance with determining that the one or more buffers of the communications component of the receiver are full:
      transmitting, by the communications component of the receiver and using the pre-existing wireless protocol, an indicator bit indicating that the one or more buffers are full; and
   upon receiving, from the transmitter, a second request for one or more power values associated with reception of RF power waves at the receiver:
      resetting, by the communications component of the receiver, at least one buffer of the one or more buffers of the communications component.

2. The method according to claim 1, wherein the indicator bit is configured to instruct the transmitter to transmit the second request for the one or more power values associated with the reception of the RF power waves.

3. The method according to claim 1, further comprising:
   receiving, by an antenna of the receiver, the plurality of RF power waves from the transmitter; and
   converting, by the receiver, the plurality of RF power waves to electrical power.

4. The method according to claim 3, further comprising continuously and consecutively determining, by the receiver, power values associated with an amount of energy received from the plurality of RF power waves.

5. The method according to claim 4, further comprising continuously and consecutively determining, by the receiver, power values indicating an amount of energy converted to electrical power from the plurality of RF power waves.

6. The method according to claim 1, wherein, during a respective iteration of the loop, the method further comprises:
   after measuring the one or more power values, generating, by the communications component of the receiver, the respective power message containing the one or more power values associated with reception of the plurality of RF power waves.

7. The method according to claim 1, wherein, during a respective iteration of the loop, the method further comprises:
after transmitting the respective power message to the transmitter, storing, by the communications component of the receiver, the respective power message containing the one or more power values into at least one output buffer memory of the one or more buffers of the communications component of the receiver.

8. The method according to claim 1, wherein, during a respective iteration of the loop, the method further comprises:
after transmitting the respective power message to the transmitter, determining whether the one or more buffers are full.

9. The method according to claim 1, wherein resetting the at least one buffer further comprises deleting one or more power messages in the at least one buffer memory.

10. The method according to claim 1, wherein resetting the at least one buffer further comprises restarting an address counter for the one or more buffers.

11. The method according to claim 1, wherein the communications component of the receiver is configured to communicate with a communications component of the transmitter over a communications signal independent of the plurality of RF power waves.

12. The method according to claim 1, wherein the communications component of the receiver comprises one or more chips configured to communicate using a lightweight wireless communications protocol.

13. A receiver device comprising:
one or more antennas;
a communications component; and
a processor configured to execute computer-readable instructions for:
receiving, by the one or more antennas, a plurality of radio frequency (RF) power waves from a transmitter that constructively interfere at a location of the receiver device;
receiving, by the communications component using a pre-existing wireless protocol that includes handshakes, from the transmitter a first request for one or more power values associated with reception of the plurality of RF power waves at the receiver device;
in response to the first request and without requiring an additional request for power values from the transmitter, continuously and consecutively executing respective iterations of a loop executed at the receiver device, each respective iteration of the loop bypassing the handshakes and other overhead processes associated with a pre-existing wireless protocol, and each respective iteration of the loop including:
measuring one or more power values associated with reception of the plurality of RF power waves received at the receiver device during the respective iteration of the loop;
transmitting a respective power message to the transmitter, wherein the respective power message contains at least the measured one or more power values; and
proceeding to a next respective iteration of the loop in accordance with a determination that one or more buffers of the communications component that are configured to store the plurality of power messages are not full;
receiving, by the antenna of the receiver, a plurality of adjusted RF power waves from the transmitter, wherein the plurality of adjusted RF power waves are adjusted by the transmitter in accordance with the one or more power values in the plurality of power messages;
in accordance with determining that the one or more buffers of the communications component are full:
transmitting, by the communications component and using the pre-existing wireless protocol, an indicator bit indicating that the one or more buffers are full; and
upon receiving, from the transmitter, a second request for one or more power values associated with reception of RF power waves at the receiver device:
resetting, by the communications component, at least one buffer of the one or more buffers of the communications component.

14. The receiver device according to claim 13, wherein the indicator bit is configured to instruct the transmitter to transmit a second request for the one or more power values associated with the reception of the RF power waves.

15. The receiver device according to claim 13, further comprising:
at least one circuit configured to convert the plurality of RF power waves to electrical power.

16. The receiver device according to claim 15, wherein the processor of the receiver is further configured to determine at least one power value based upon an amount of energy captured from the plurality of RF power waves.

17. The receiver device according to claim 15, wherein the processor of the receiver is further configured to determine at least one power value based upon an amount of energy converted to electrical power from the plurality of RF power waves.

18. The receiver device according to claim 13, wherein the communications component of the receiver is configured to communicate with a communications component of the transmitter over a communications signal independent of the plurality of RF power waves.

19. The receiver device according to claim 13, wherein the communications component of the receiver comprises one or more chips configured to communicate using a lightweight wireless communications protocol.

* * * * *